(12) United States Patent
Adachi

(10) Patent No.: US 12,479,298 B2
(45) Date of Patent: Nov. 25, 2025

(54) IN-VEHICLE DISPLAY DEVICE

(71) Applicant: Panasonic Automotive Systems Co., Ltd., Kanagawa (JP)

(72) Inventor: Ayumi Adachi, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/618,062

(22) Filed: Mar. 27, 2024

(65) Prior Publication Data
US 2024/0326595 A1 Oct. 3, 2024

(30) Foreign Application Priority Data
Mar. 30, 2023 (JP) .................. 2023-055783

(51) Int. Cl.
*B60K 35/50* (2024.01)
(52) U.S. Cl.
CPC ........ *B60K 35/50* (2024.01); *B60K 2360/688* (2024.01); *B60K 2360/691* (2024.01); *B60K 2360/77* (2024.01); *B60K 2360/816* (2024.01)
(58) Field of Classification Search
None
See application file for complete search history.

(56) References Cited

U.S. PATENT DOCUMENTS

| | | | |
|---|---|---|---|
| 9,452,718 B1 * | 9/2016 | Dry | B60N 2/80 |
| 11,353,924 B1 * | 6/2022 | Miedema | G02F 1/133526 |
| 2009/0127897 A1 * | 5/2009 | Watanabe | B60R 11/0235 |
| | | | 297/217.3 |
| 2012/0155035 A1 * | 6/2012 | Chen | H04M 1/0266 |
| | | | 361/728 |
| 2016/0107553 A1 * | 4/2016 | Imajo | B60N 2/68 |
| | | | 297/452.18 |
| 2016/0257247 A1 * | 9/2016 | Munday | B60Q 3/44 |
| 2017/0274825 A1 * | 9/2017 | Woodhouse | B60R 1/008 |
| 2020/0297119 A1 * | 9/2020 | Nelson | B60Q 3/233 |
| 2024/0326595 A1 * | 10/2024 | Adachi | B60N 2/91 |

FOREIGN PATENT DOCUMENTS

| | | |
|---|---|---|
| JP | 2006-96085 | 4/2006 |
| JP | 2010-193163 | 9/2010 |

\* cited by examiner

*Primary Examiner* — Daniel T Tekle
(74) *Attorney, Agent, or Firm* — Seed Intellectual Property Law Group LLP

(57) ABSTRACT

An in-vehicle display device capable of reducing an impact applied to a vehicle body from a lateral direction is provided. The display device includes a rear bezel fixed to the vehicle body, a front bezel attached to the rear bezel, a frame including an outer edge portion attached to the front bezel, a display panel including an outer peripheral edge fixed to an inner peripheral edge of the frame, and a frame extension portion extending from the frame and disposed at least close to a side portion of the front bezel. The display panel is supported so as to be movable together with the frame with respect to the rear bezel by the frame extension portion being pressed by the side portion deformed due to an impact applied from a lateral side of the vehicle body.

4 Claims, 22 Drawing Sheets

IN-VEHICLE DISPLAY DEVICE

CROSS-REFERENCE TO RELATED APPLICATIONS

This application is based on and claims priority under 35 USC 119 from Japanese Patent Application No. 2023-055783 filed on Mar. 30, 2023, the entire content of which is incorporated herein by reference.

TECHNICAL FIELD

The present disclosure relates to an in-vehicle display device.

BACKGROUND ART

There is known a display device that provides an image for a passenger in a rear seat of a vehicle (see Patent Literature 1, for example). This type of display device includes a partition type display device provided between a front seat and a rear seat of a vehicle. Recently, such a display device is being considered for use in, for example, a partition rear seat entertainment (RSE) mechanism.

CITATION LIST

Patent Literature

Patent Literature 1: JP2010-193163A

SUMMARY OF INVENTION

Incidentally, in recent years, transparent organic light emitting diodes (OLEDs) have been put into practical use in display devices. When a transparent OLED is used in a partition type display device for a rear seat passenger, a back portion of an OLED panel can be seen through, and thus a structure supporting the OLED panel cannot be provided on a back side of the OLED panel. Therefore, the OLED panel has a structure in which both sides are supported by a frame-shaped frame. In a case in which the OLED panel has the structure in which both sides are supported only by the frame-shaped frame, the OLED panel is vulnerable to an impact from a side direction, and therefore, when a side collision occurs while the vehicle is traveling, there is a problem that the OLED may be damaged or scattered.

The present disclosure has been made in view of the above-described circumstances in the related art, and an object of the present disclosure is to provide an in-vehicle display device capable of reducing an impact applied to an OLED from a lateral direction.

The present disclosure provides an in-vehicle display device supported by a vehicle body and disposed between a front seat and a rear seat of the vehicle body. The in-vehicle display device includes a rear bezel fixed to the vehicle body; a front bezel attached to the rear bezel; a frame including an outer edge portion attached to the front bezel; a display panel including an outer peripheral edge fixed to an inner peripheral edge of the frame; and a frame extension portion extending from the frame and disposed at least close to a side portion of the front bezel. The display panel is supported so as to be movable together with the frame with respect to the rear bezel by the frame extension portion being pressed by the side portion deformed due to an impact applied from a lateral side of the vehicle body.

Further, the present disclosure provides an in-vehicle display device supported by a vehicle body and disposed between a front seat and a rear seat of the vehicle body. The in-vehicle display device includes a rear bezel fixed to the vehicle body; a front bezel attached to the rear bezel; a frame including an outer edge portion attached to the front bezel; a display panel including an outer peripheral edge fixed to an inner peripheral edge of the frame; and an impact absorption member disposed at least between a side portion of the front bezel and the frame. The display panel is supported such that at least a part of a load applied via the frame by the side portion deformed due to an impact applied from a lateral side of the vehicle body is absorbable by the impact absorption member.

According to the present disclosure, the impact applied to the OLED from the lateral direction can be reduced by moving the OLED.

Further, according to the present disclosure, the impact applied to the OLED from the lateral direction can be absorbed by the impact absorption member, thereby reducing the impact.

DESCRIPTION OF EMBODIMENTS

Hereinafter, embodiments specifically disclosing an in-vehicle display device according to the present disclosure will be described in detail with reference to the drawings as appropriate. However, unnecessarily detailed descriptions may be omitted. For example, detailed description of well-known matters and redundant description of substantially the same configuration may be omitted. This is to avoid the following description from being unnecessarily redundant and facilitate understanding for those skilled in the art. The accompanying drawings and the following description are provided for those skilled in the art to fully understand the present disclosure, and are not intended to limit the subject matters described in the claims.

Embodiment 1

Figure 1:
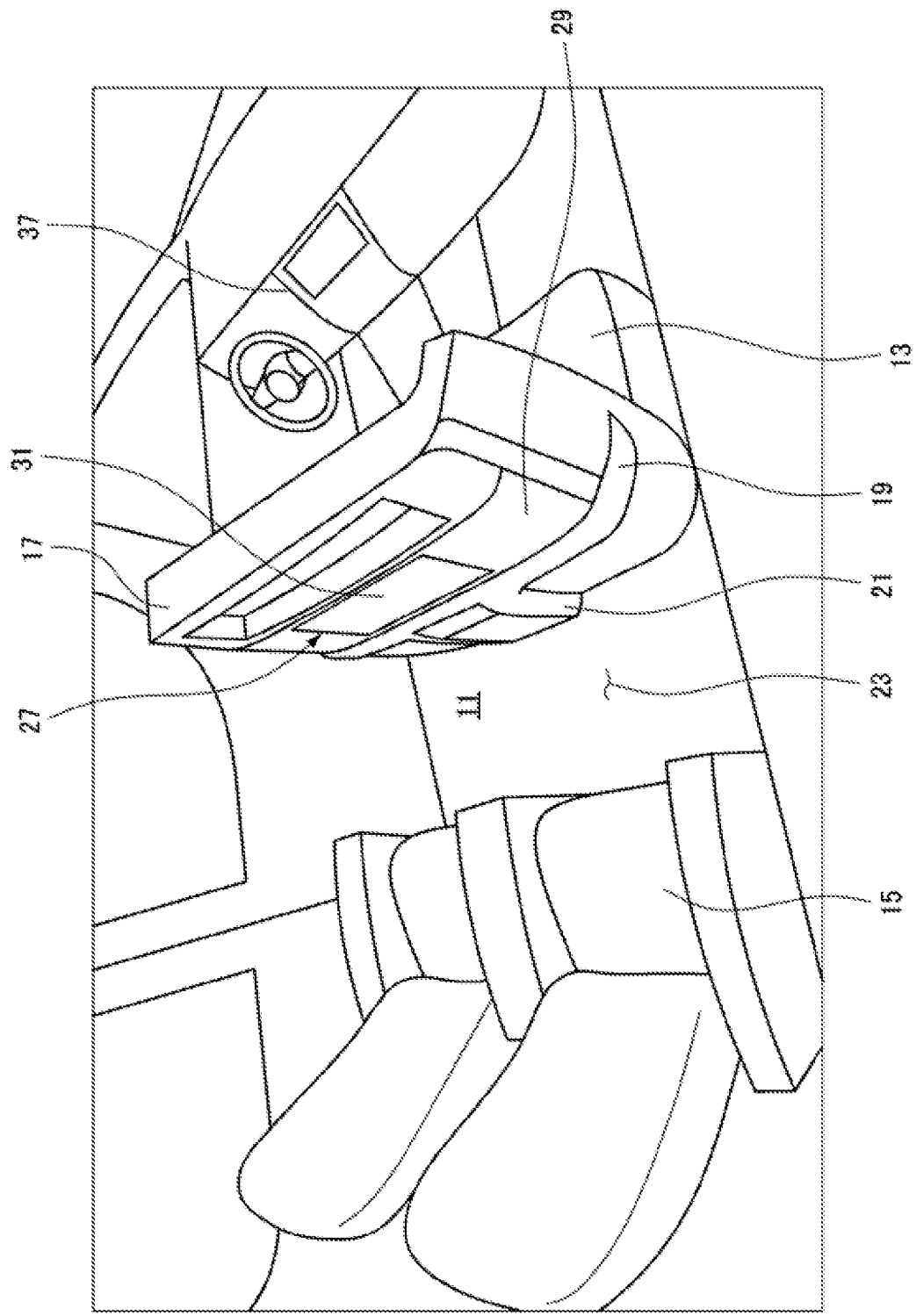
FIG. 1 is a perspective view illustrating a schematic configuration of a vehicle interior including an in-vehicle display device according to an embodiment 1.

FIG. 1 is a perspective view illustrating a schematic configuration of a vehicle interior 11 including an in-vehicle display device according to Embodiment 1.

The in-vehicle display device according to Embodiment 1 is suitable for use in a partition RSE mechanism or the like provided between a front seat 13 and a rear seat 15. In the partition RSE mechanism, for example, a bottom wall portion 19 of a partition 17 is fixed to a vehicle floor 23 by a leg portion 21. A pair of column portions 25 (see FIG. 2) that stand apart from each other in a left-right direction are fixed to the bottom wall portion 19. The in-vehicle display device (hereinafter, simply referred to as "display device") is attached to the partition 17 across the pair of column portions 25. The partition 17 is covered with an exterior cover 29 so that only a display device 27 is exposed. The column portion 25 of the partition 17 may include an upper end fixed to a roof panel in addition to the vehicle floor 23. The partition RSE mechanism is not limited thereto as long as the display device 27 is disposed between the front seat 13 and the rear seat 15 and is supported by a vehicle body.

Figure 2:
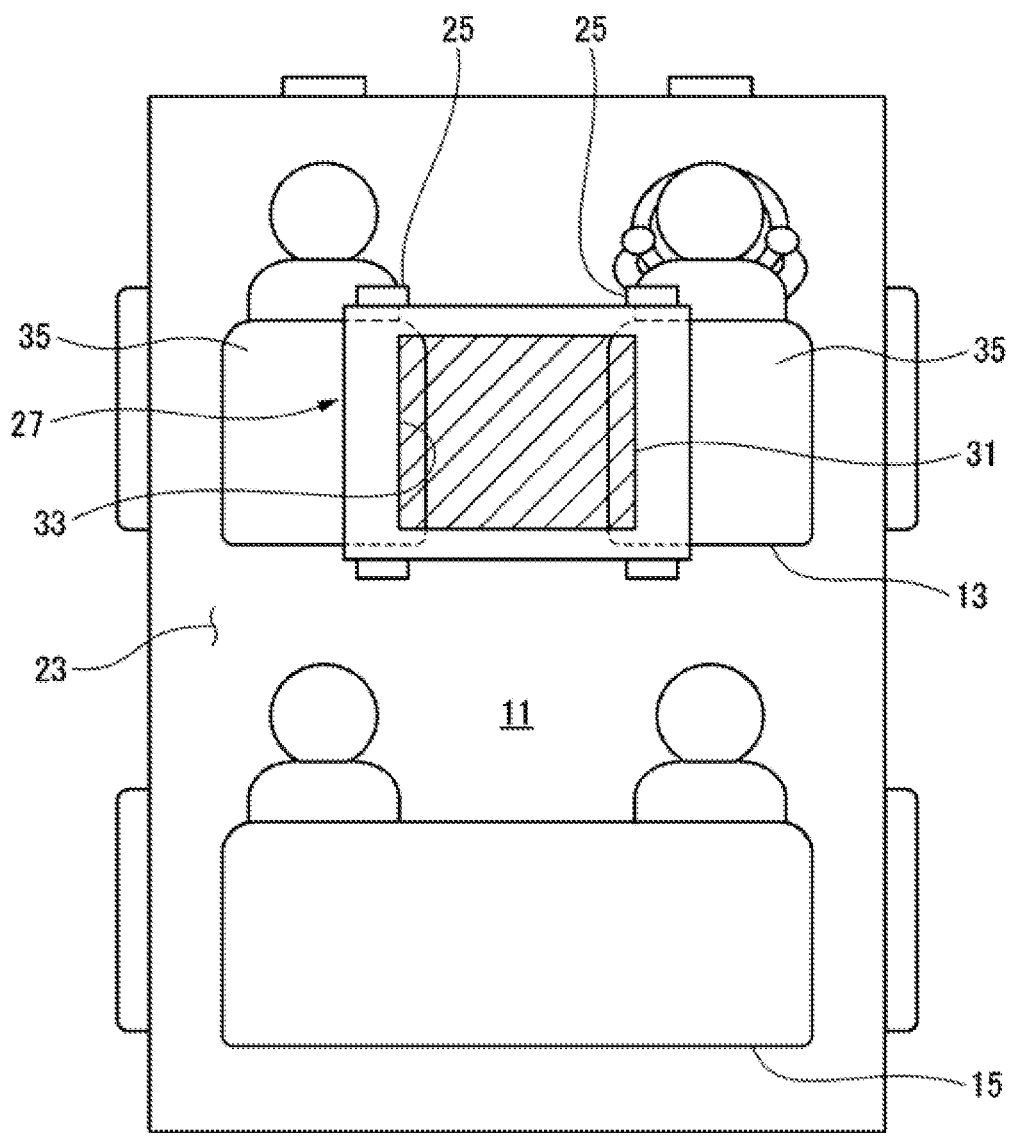
FIG. 2 is a front view schematically illustrating the vehicle interior provided with a partition RSE mechanism in which an exterior cover is omitted.

FIG. 2 is a front view schematically illustrating the vehicle interior 11 provided with the partition RSE mechanism in which the exterior cover 29 is omitted.

In the in-vehicle display device, the display device 27 is supported by the column portions 25. The display device 27 includes an OLED 31, and a display area 33 of the OLED 31 is transparent when the display device 27 is not driven. In a case in which the front seat 13 is a separate seat that is separated into a driver seat and a front passenger seat, the display device 27 allows an instrument panel 37 (see FIG. 1) or a scene in front of the vehicle to be viewed from between a seat back 35 of the driver seat and a seat back 35 of the front passenger seat through the transparent display area 33 of the OLED 31. That is, when the display device 27 is not driven, the partition RSE mechanism can reduce feelings of being confined and oppressed in the rear seat 15.

Figure 3:
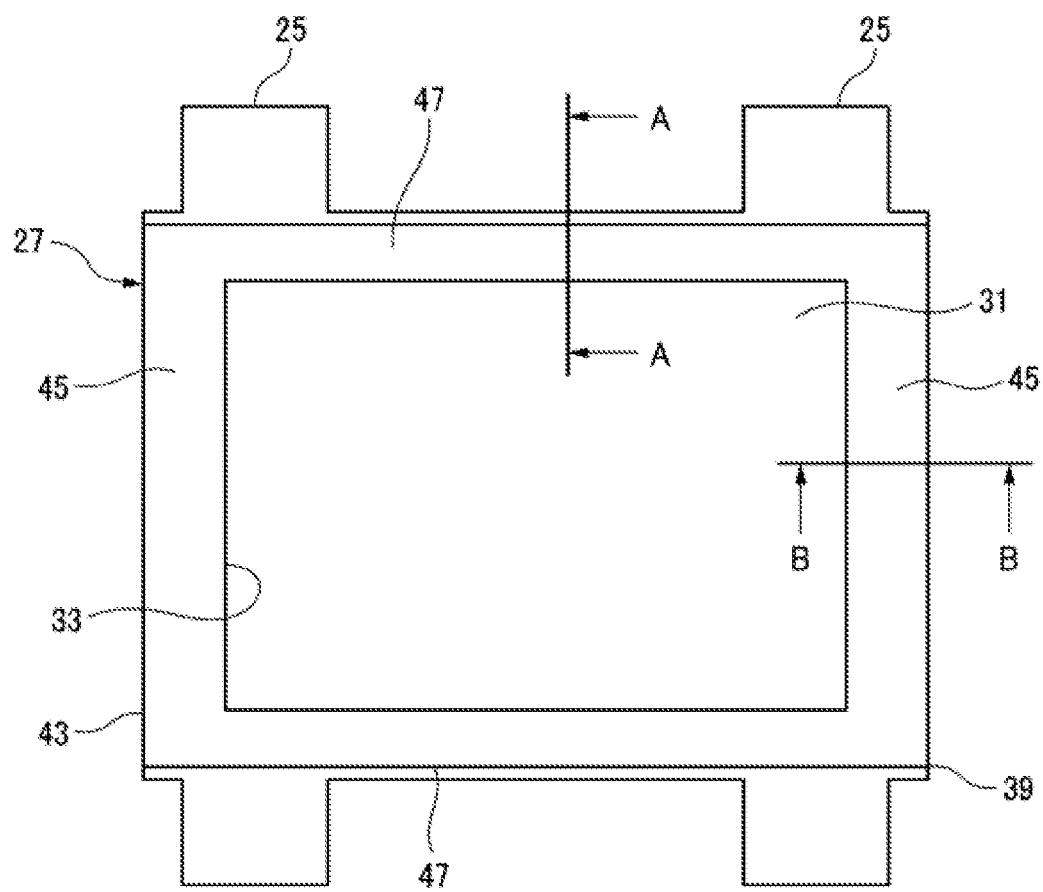
FIG. 3 is a front view of the display device illustrated in FIG. 2.

FIG. 3 is a front view of the display device 27 illustrated in FIG. 2.

The in-vehicle display device (that is, display device 27) according to Embodiment 1 has a function of reducing an impact applied from a lateral side of the vehicle body (right side or left side in FIG. 3). The display device 27 includes a frame-shaped bezel 39. The bezel 39 constitutes a frame body having a rectangular frame shape by combining a rear bezel 41 and a front bezel 43. That is, the bezel 39, which is a frame body, is configured by connecting a pair of left and right parallel vertical frame portions 45 and a pair of upper and lower parallel lateral frame portions 47 in a rectangular frame shape. The rear bezel 41 is fixed to the vehicle body via the column portions 25 by being fixed to the column portions 25. The rear bezel 41 and the column portions 25 may be integrally formed. That is, the rear bezel 41 and the column portions 25 may be provided as one member configured as a part of the vehicle body. The front bezel 43 is attached to the rear bezel 41. The front bezel 43 is attached to the rear bezel 41 by a fastening member such as a screw.

Figure 4:
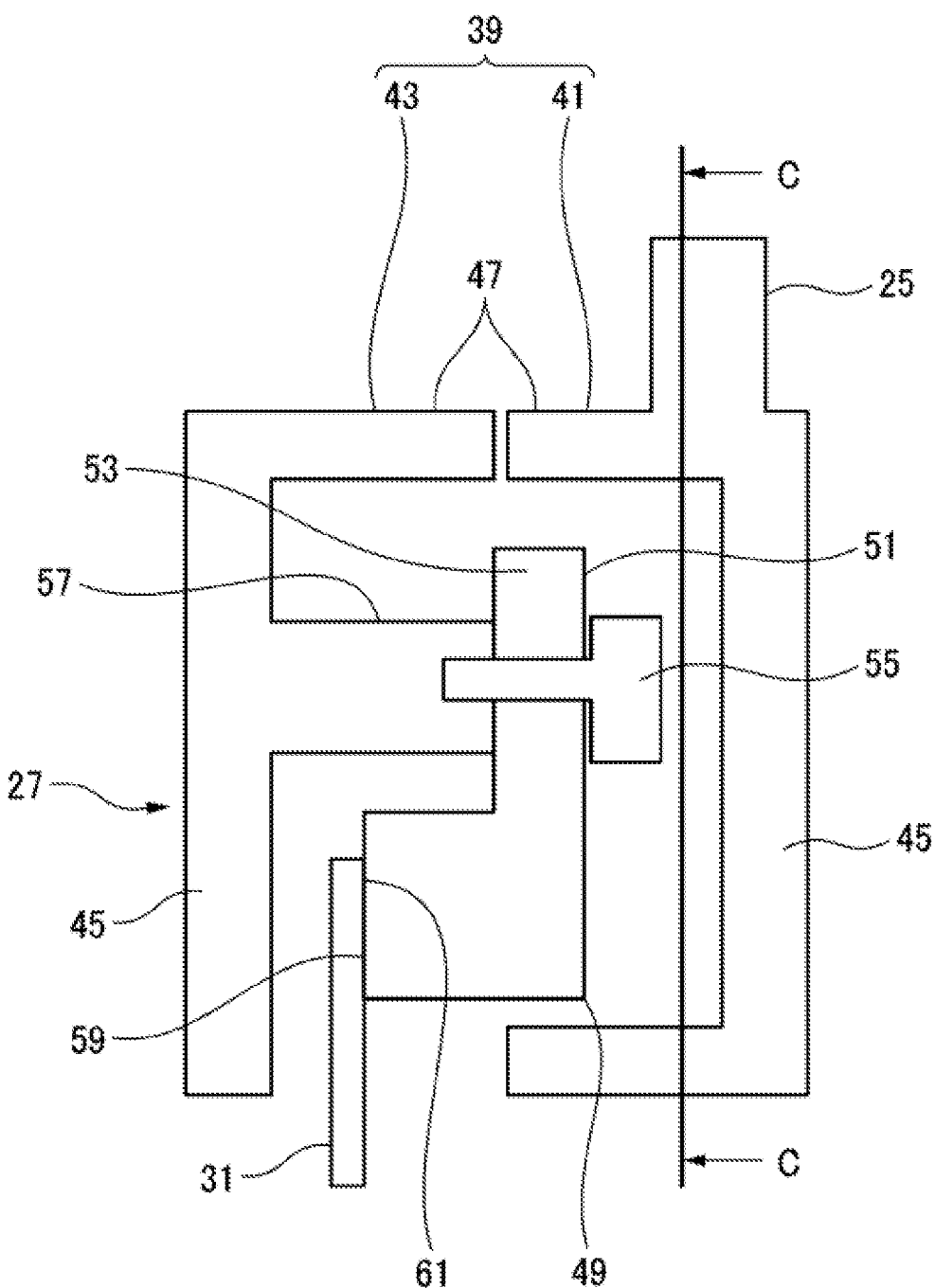
FIG. 4 is a sectional view taken along line A-A in FIG. 3.

FIG. 4 is a sectional view taken along line A-A in FIG. 3.

An outer edge portion 51 of a frame 49 formed in a frame shape is attached to the front bezel 43 by a fastening member such as a screw. Only the outer edge portion 51 of a lateral frame portion 53 of the frame 49 is attached to the front bezel 43. A plurality of fixing bosses 57 into which screws 55 are screwed are formed on an inner surface of the front bezel 43. The OLED 31 is fixed to the frame 49. An outer peripheral edge 61 of the OLED 31 is fixed to an inner peripheral edge 59 of the frame 49. Accordingly, the OLED 31 is supported by the front bezel 43 via the frame 49, and the front bezel 43 is supported by the column portions 25 via the rear bezel 41.

Figure 5:
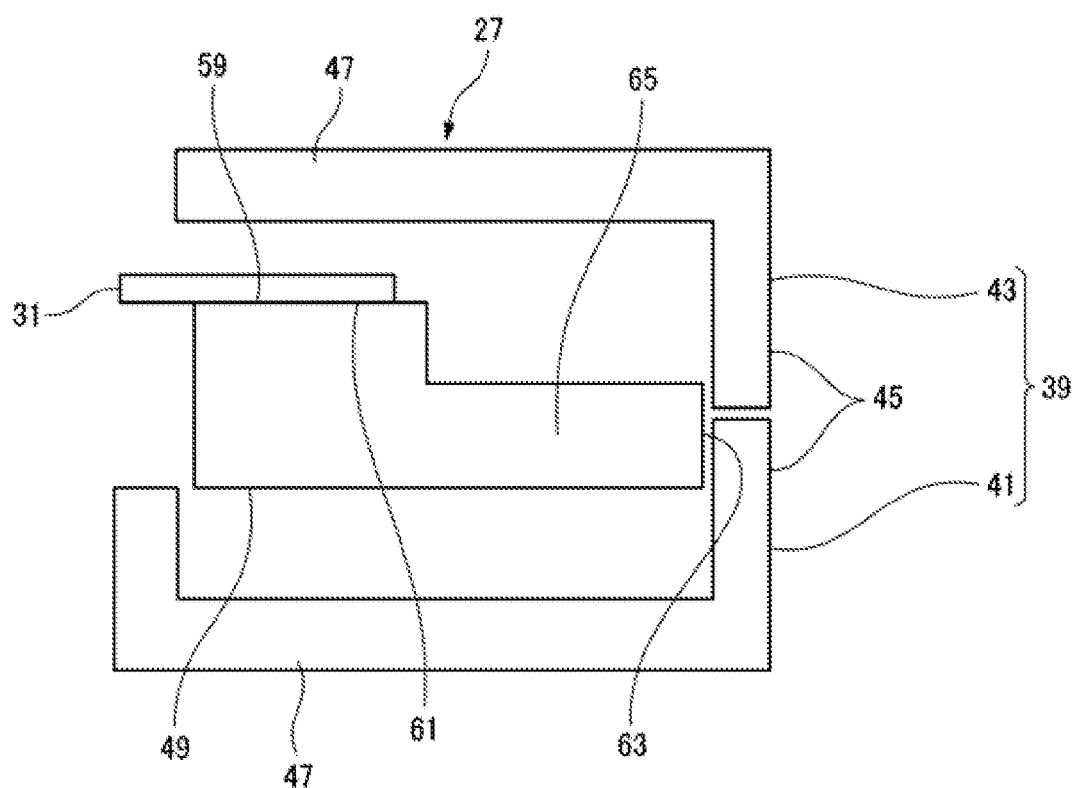
FIG. 5 is a sectional view taken along line B-B in FIG. 3.

FIG. 5 is a sectional view taken along line B-B in FIG. 3.

The frame 49 includes a frame extension portion 63. The frame extension portion 63 extends from a vertical frame portion 65 of the frame 49, and is disposed close to at least a side portion of the front bezel 43. The side portion of the front bezel 43 is the vertical frame portion 45 of the bezel 39. In Embodiment 1, the frame extension portion 63 is disposed close to the vertical frame portions 45 of both the front bezel 43 and the rear bezel 41.

Figure 6:
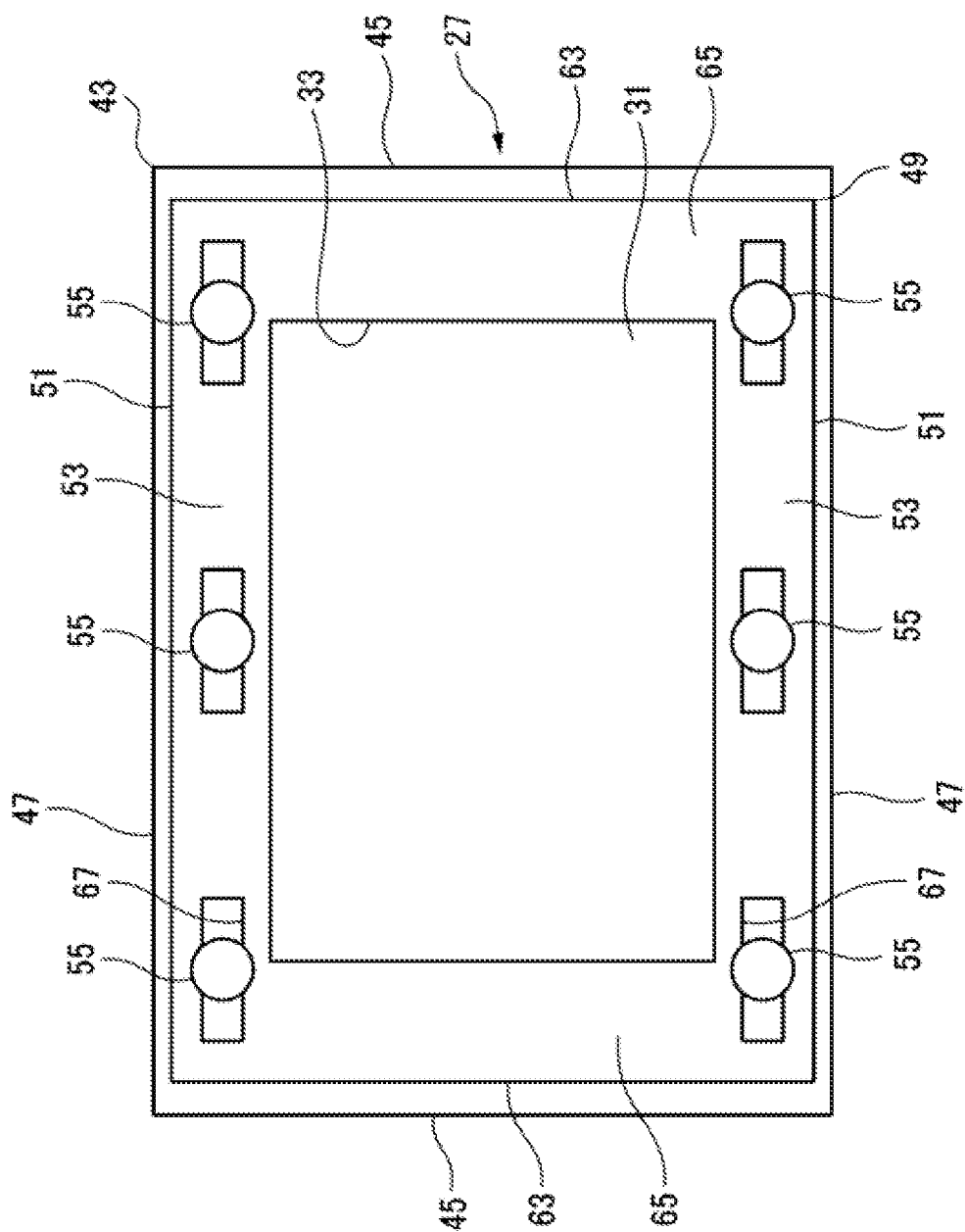
FIG. 6 is a sectional view taken along line C-C in FIG. 4.

FIG. 6 is a sectional view taken along line C-C in FIG. 4.

A plurality of screw-fastening portions are formed in each of the upper and lower lateral frame portions 53 of the frame 49. The plurality of screw-fastening portions (for example, three screw-fastening portions) are formed apart from each other along a longitudinal direction of the lateral frame portion 53. The screw-fastening portion can be formed, for example, by a groove portion 67 that is elongated in the longitudinal direction of the lateral frame portion 53. The frame 49 is attached to the front bezel 43 by screwing the screw 55 inserted into the groove portion 67 into the fixing boss 57 of the front bezel 43 (see FIG. 4). The vertical frame portion 65 and the frame extension portion 63 are not attached to the front bezel 43. That is, the vertical frame portion 65 and the frame extension portion 63 are not fixed to the front bezel 43 (in other words, movable).

Figure 7:
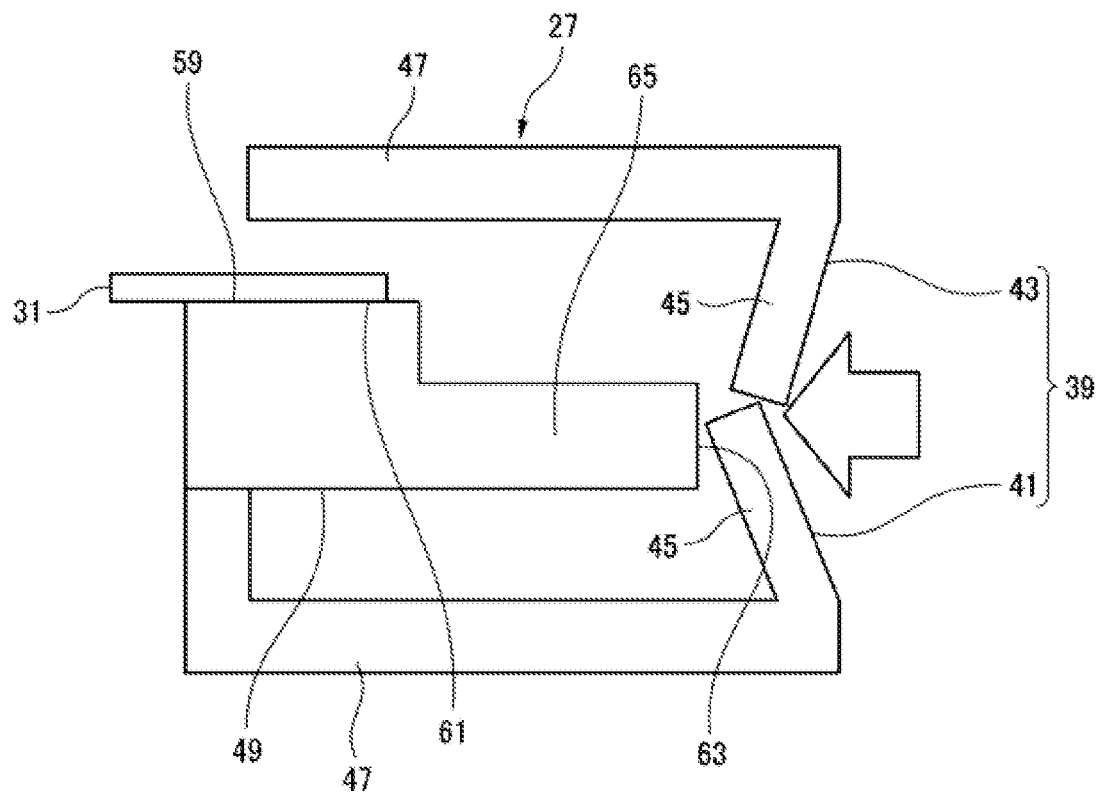
FIG. 7 is a plan sectional view of a main portion of the display device in which a side portion of a bezel is deformed by an impact due to a side collision.

FIG. 7 is a plan sectional view of a main portion of the display device 27 in which a side portion of the bezel 39 is deformed by an impact due to a side collision. The plan sectional position of the main portion in FIG. 7 is the same as the sectional position taken along line B-B in FIG. 3.

In the in-vehicle display device, when the side portion of the bezel 39 is deformed by the impact due to the side collision and the frame extension portion 63 is pressed by deformation, the OLED 31 is moved (slid) together with the frame 49 with respect to the rear bezel 41. That is, the frame 49 illustrated in FIG. 7 is moved (slid) leftward with respect to the rear bezel 41 compared with a state of the frame 49 before the side collision illustrated in FIG. 5.

Figure 8:
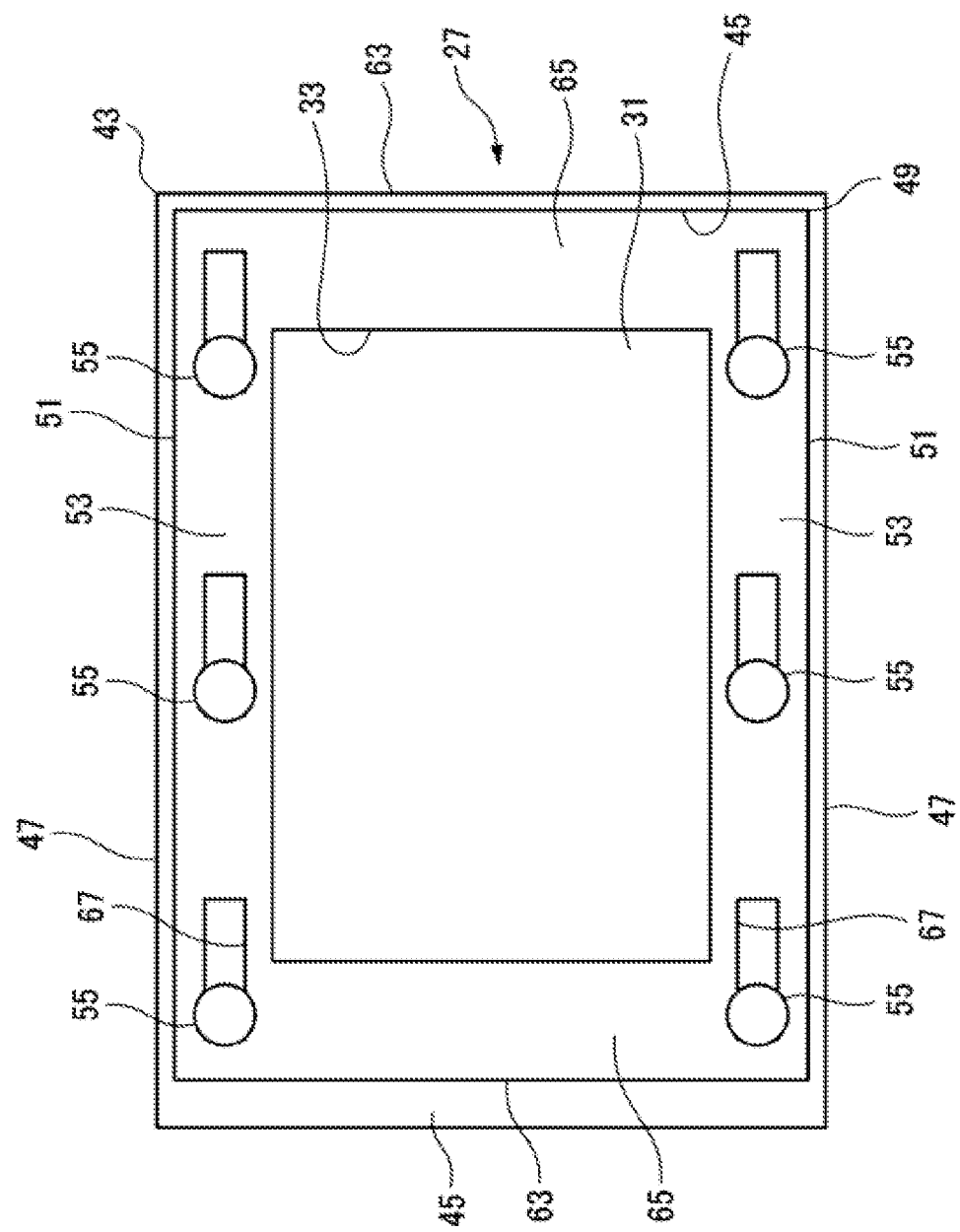
FIG. 8 is a rear view of the display device in which a frame is moved by the impact due to the side collision.

FIG. 8 is a rear view of the display device 27 in which the frame 49 is moved by the impact due to the side collision. The rear view in FIG. 8 is in the same direction as the C-C arrow view in FIG. 4.

The frame 49, which is moved (slid) leftward as illustrated in FIG. 7, moves (slides) rightward in the rear view illustrated in FIG. 8. That is, in the in-vehicle display device, the screw-fastening portion formed in the frame 49 is formed by the groove portion 67 that is elongated in a movement (sliding) direction.

Next, a modification of the in-vehicle display device according to Embodiment 1 will be described.

Modification 1 of Embodiment 1

Figure 9:
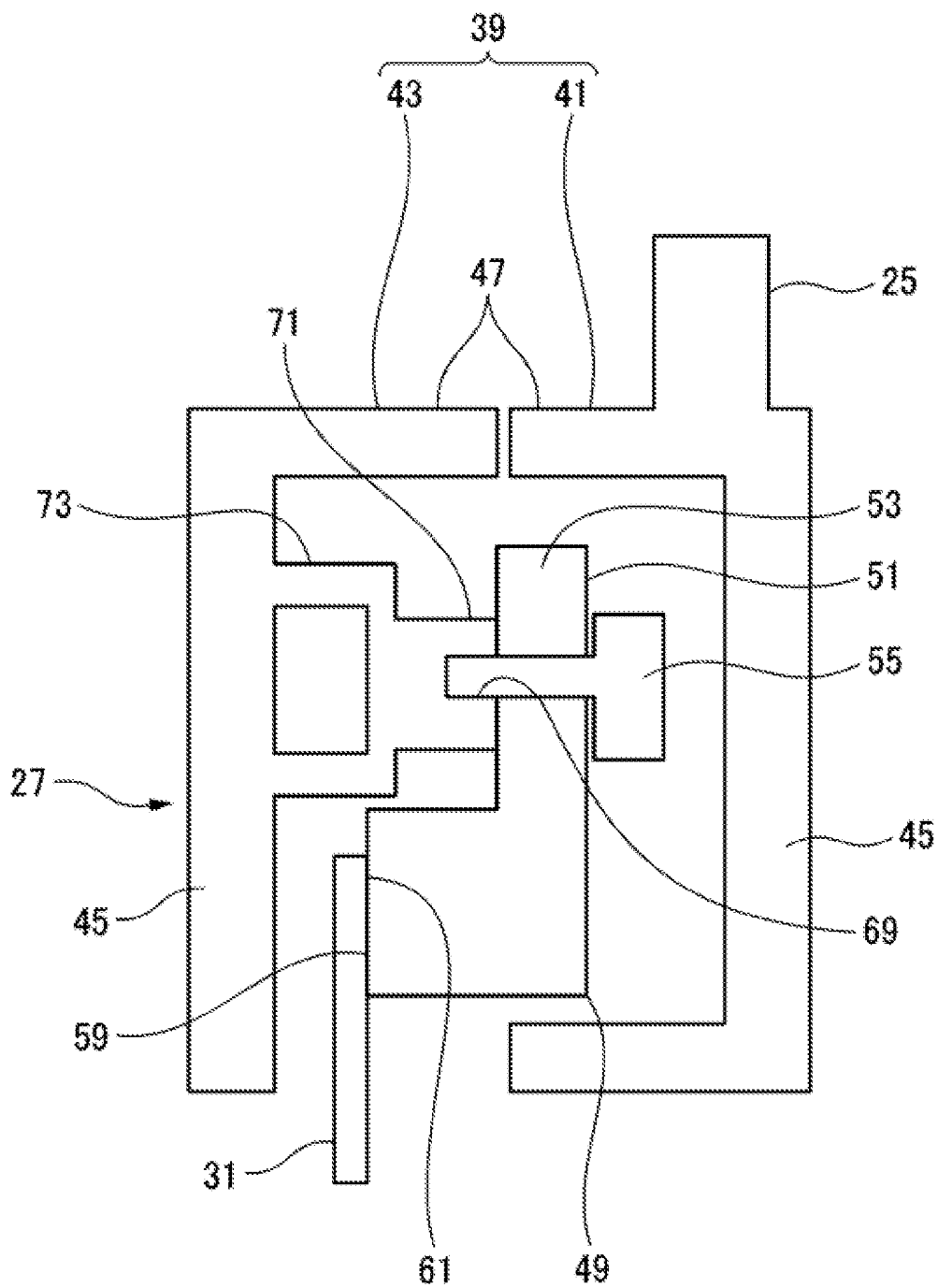
FIG. 9 is a side sectional view of a main portion of a bezel according to a modification 1 of the embodiment 1.

FIG. 9 is a side sectional view of a main portion of the bezel 39 according to Modification 1 of Embodiment 1. The side sectional position of the main portion in FIG. 9 is the same as the sectional position taken along line A-A in FIG. 3.

In the in-vehicle display device according to Modification 1 of Embodiment 1, a screw-fastening portion is formed in frame 49. The screw-fastening portion may be a perfectly circular hole through which the screw 55 can be inserted. The front bezel 43 is formed with a boss 71 including a female screw portion 69 into which the screw 55 inserted into the screw-fastening portion is screwed. A fragile portion 73 having a load capacity lower than a load of pressing is formed at a base portion of the boss 71 between the front bezel 43 and the female screw portion 69. Here, similarly to the above, the pressing is pressing when the side portion of the bezel 39 is deformed (see FIG. 7) by the impact due to the side collision, and the frame extension portion 63 is pressed by the deformation.

Figure 10:
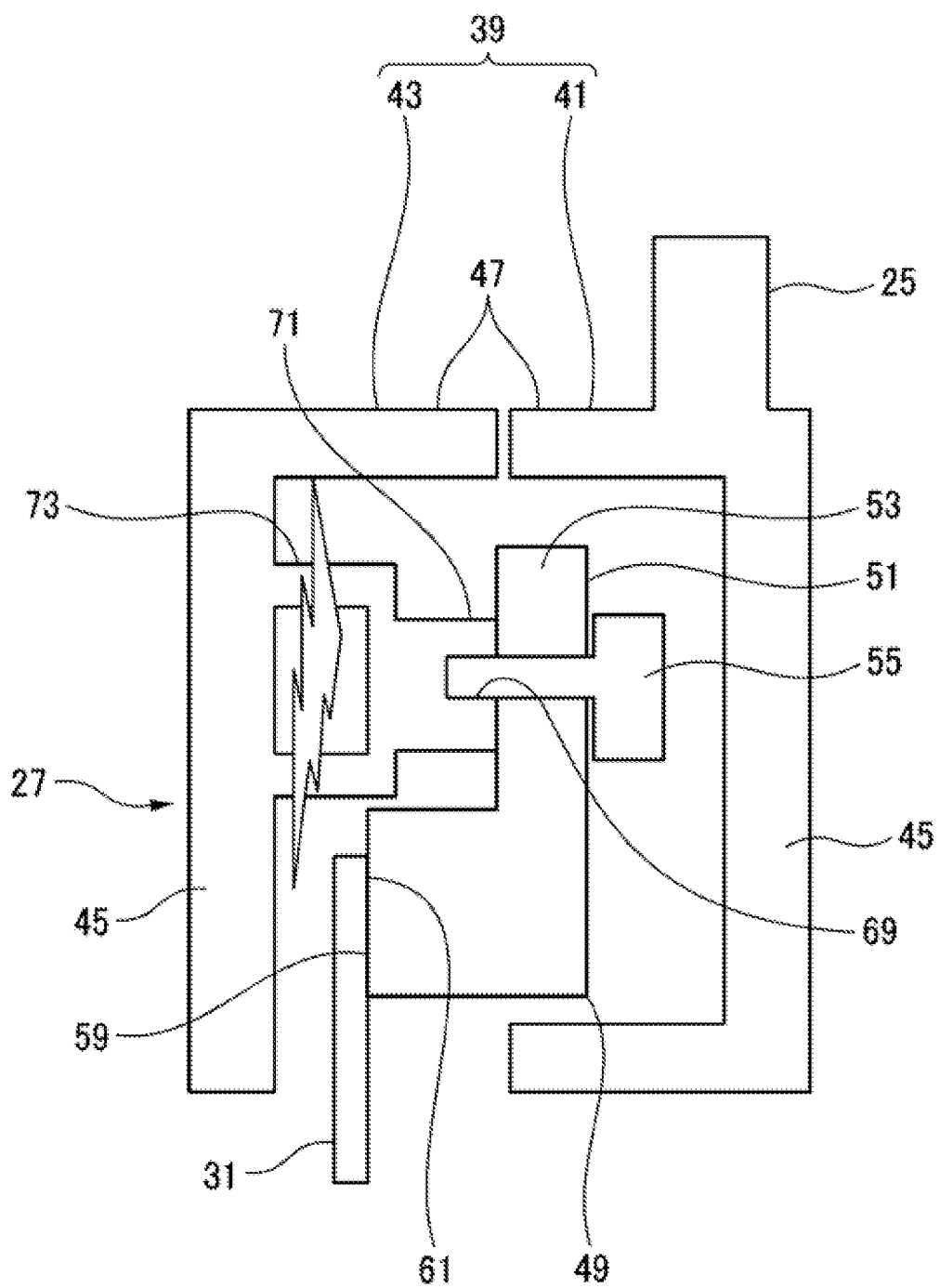
FIG. 10 is a side sectional view of a main portion of a display device in which a fragile portion is broken by an impact due to a side collision and a frame moves.

FIG. 10 is a side sectional view of a main portion of the display device 27 in which the fragile portion 73 is broken by the impact due to the side collision and the frame 49 is moved.

In the in-vehicle display device according to Modification 1 of Embodiment 1, when the side portion of the bezel 39 is deformed by the impact due to the side collision and the frame extension portion 63 is pressed by the deformation, the fragile portion 73 provided at the base portion of the boss 71 is broken. Accordingly, in the display device 27, the OLED 31 is moved (slid) together with the frame 49 with respect to the rear bezel 41. In the display device 27, even if support of the frame 49 with respect to the front bezel 43 is lost, since the frame 49 is positioned in an internal space surrounded by the rear bezel 41 and the front bezel 43, the frame 49 is continuously held inside the bezel 39, and thus the frame 49 and the OLED 31 do not fall off from the bezel 39.

Modification 2 of Embodiment 1

Figure 11:
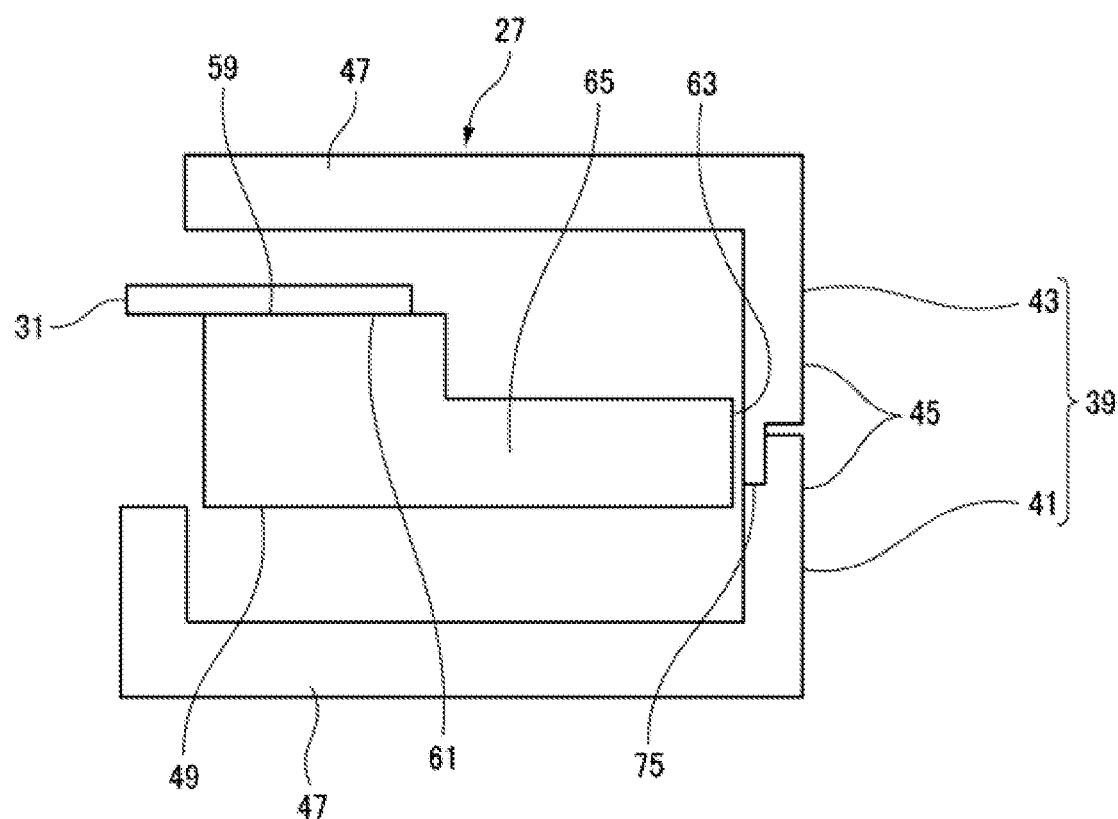
FIG. 11 is a plan sectional view of a main portion of a bezel according to a modification 2 of the embodiment 1.

FIG. 11 is a plan sectional view of a main portion of the bezel 39 according to Modification 2 of Embodiment 1. The plan sectional position of the main portion in FIG. 11 is the same as the sectional position taken along line B-B in FIG. 3.

In the in-vehicle display device according to Modification 2 of Embodiment 1, the rear bezel 41 and the front bezel 43 are engaged with each other by hooks 75 that can be engaged and disengaged along all three sides other than a bottom side of the rectangular frame shape. As illustrated in FIG. 11, in the bezel 39, the vertical frame portion 45 of the rear bezel 41 and the vertical frame portion 45 of the front bezel 43 are connected by the hook 75.

Figure 12:
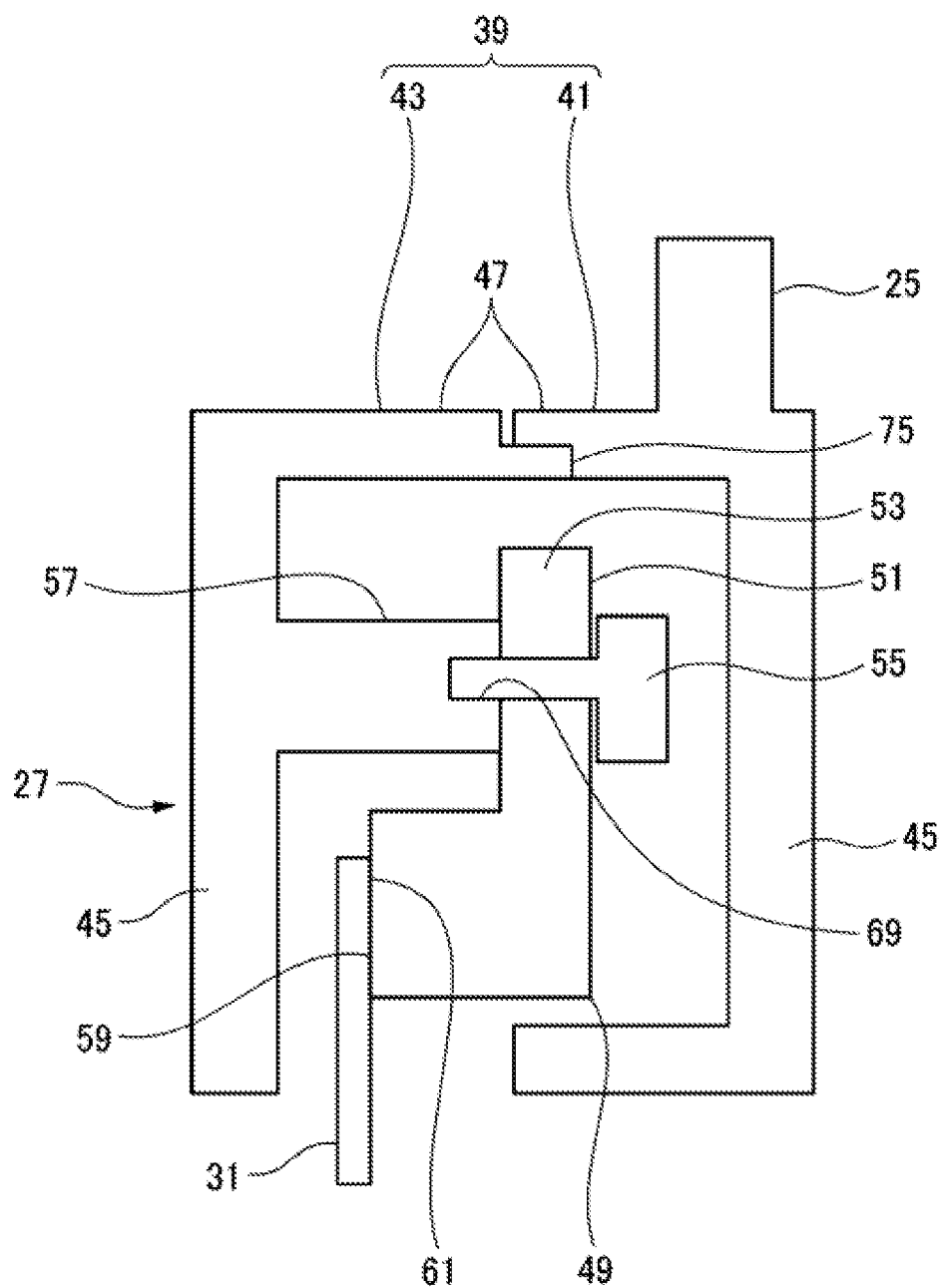
FIG. 12 is a side sectional view of the main portion of the bezel according to the modification 2 of the embodiment 1.

FIG. 12 is a side sectional view of the main portion of the bezel 39 according to Modification 2 of Embodiment 1. The side sectional position of the main portion in FIG. 12 is the same as the sectional position taken along line A-A in FIG. 3.

As illustrated in FIG. 12, in the bezel 39, the lateral frame portion 47 of the rear bezel 41 and the lateral frame portion 47 of the front bezel 43 are integrally connected by the hook 75. The screw-fastening portion for fixing the frame 49 to the front bezel 43 may be a perfectly circular hole through which the screw 55 can be inserted. The front bezel 43 is formed with the fixing boss 57 including the female screw portion 69 into which the screw 55 inserted into the screw-fastening portion is screwed. This fixing boss 57 does not need the above-described fragile portion 73.

Figure 13:
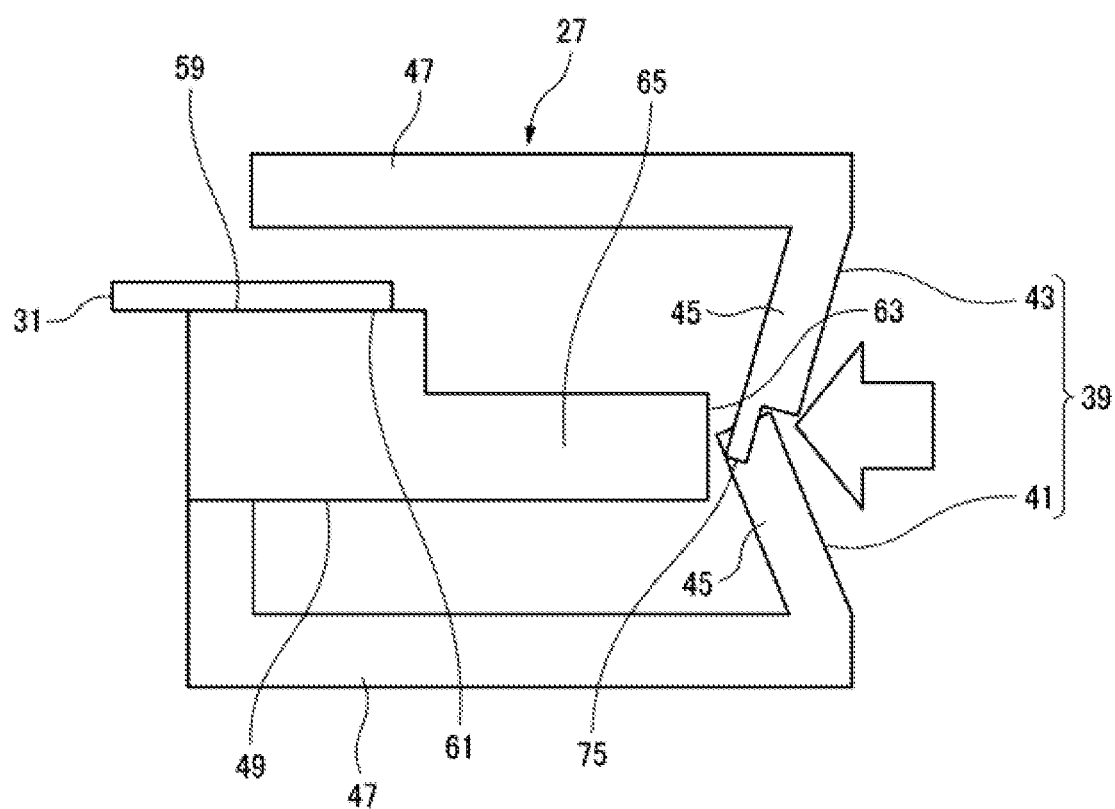
FIG. 13 is a plan sectional view of a main portion of a display device in which a side portion of the bezel is deformed by an impact due to a side collision.

FIG. 13 is a plan sectional view of a main portion of the display device 27 in which the side portion of the bezel 39 is deformed by an impact due to a side collision. The plan sectional position of the main portion in FIG. 13 is the same as the sectional position taken along line B-B in FIG. 3.

In the in-vehicle display device according to Modification 2 of Embodiment 1, when the side portion of the bezel 39 is deformed by the impact due to the side collision and the frame extension portion 63 is pressed by the deformation, the hook 75 on the vertical frame portion 45 of the bezel 39 is disengaged. The OLED 31 can move (slide) together with the frame 49 and the front bezel 43 with respect to the rear bezel 41 by disengagement of the hook 75 by pressing. That is, by the disengagement of the hook 75 by pressing, the frame extension portion 63 of the frame 49 is pressed by the front bezel 43 and the rear bezel 41, and thus the OLED 31 fixed to the frame 49 moves (slides). Even if the hook 75 is disengaged from the vertical frame portion 45 of the bezel 39, the hook 75 is not disengaged from the lateral frame portion 47 of the bezel 39. Accordingly, the front bezel 43, the frame 49, and the OLED 31 are configured not to fall off from the rear bezel 41.

Next, operations of the above-described configuration will be described.

The in-vehicle display device (that is, display device 27) according to Embodiment 1 is supported by the vehicle body and disposed between the front seat 13 and the rear seat 15 of the vehicle body. The display device 27 includes the rear bezel 41 fixed to the vehicle body, the front bezel 43 attached to the rear bezel 41, the frame 49 including the outer edge portion 51 attached to the front bezel 43, a display panel (for example, OLED 31) including the outer peripheral edge 61 fixed to the inner peripheral edge 59 of the frame 49, and the frame extension portion 63 extending from the frame 49 and disposed close to at least a side portion of the front bezel 43. The OLED 31 is supported so as to be movable together with the frame 49 with respect to the rear bezel 41 by the frame extension portion 63 being pressed by the side portion of the bezel 39 deformed due to an impact (for example, side collision) applied from a lateral side of the vehicle body.

In the in-vehicle display device according to Embodiment 1, the rear bezel 41 is fixed to the vehicle body between the front seat 13 and the rear seat 15 of the vehicle body. The front bezel 43 is attached to the rear bezel 41 toward the rear seat 15 so as to face the rear seat 15. The outer edge portion 51 of the frame 49 is attached to the front bezel 43. The outer peripheral edge 61 of the OLED 31 is fixed to the inner peripheral edge 59 of the frame 49. That is, in the OLED 31, the frame 49 fixed to the outer peripheral edge 61 is held and accommodated between the rear bezel 41 and the front bezel 43, and only the display area 33 is exposed through an internal opening of the bezel 39.

Since the OLED 31 is transparent, an object disposed on a back side of the OLED 31 can be visually recognized by visible light transmitted through the display area 33. Since the portion other than the bezel 39 that covers the outer peripheral edge 61 of the OLED 31 is the transparent display area 33 of the OLED 31, when the display device 27 is driven, the display device 27 can provide a passenger in the rear seat 15 with a highly entertaining viewing space where images visually blend into back or surroundings thereof. Further, when the display device 27 is not driven, since the OLED 31 is transparent, the feelings of being confined and oppressed in the rear seat 15 can be reduced.

In this in-vehicle display device, the OLED 31 is supported so as to be movable together with the frame 49 accommodated between the rear bezel 41 and the front bezel 43 with respect to the rear bezel 41. The frame 49 is provided with the frame extension portion 63 disposed close to at least the side portion of the front bezel 43. Here, "at least" means that the frame extension portion 63 may be disposed close to a side portion of the rear bezel 41 in addition to the side portion of the front bezel 43.

Accordingly, in the in-vehicle display device, in a case in which a side surface of the vehicle body is subjected to a strong impact, and a side door or a vehicle body pillar is deformed inward in a vehicle width direction due to an impact load, when door trim or pillar trim protrudes into the vehicle interior and hits the front bezel 43, the frame extension portion 63 is pressed by the side portion of the front bezel 43 deformed by the impact. The frame-shaped frame 49 is moved together with the OLED 31 fixed in the frame with respect to the rear bezel 41 by pressing the frame extension portion 63. That is, the OLED 31 moves together with the frame 49 in a direction in which the impact load is applied (that is, lateral direction parallel to a display surface), so that the impact load acting on the OLED 31 is reduced as compared with that acting on a support structure in which the OLED 31 is rigidly fixed. That is, in the in-vehicle display device, the impact applied to the OLED 31 can be released (reduced). As a result, even in an in-vehicle display device using the transparent OLED 31 in which a structure for support cannot be provided on the back side, the OLED 31 can be prevented from being damaged and scattered during a side collision.

Further, in the in-vehicle display device (that is, display device 27), the screw-fastening portion formed in the frame 49 is formed by the groove portion 67 that is elongated in the movement direction. The frame 49 is attached to the front bezel 43 by screwing the screw 55 inserted into the groove portion 67 into the front bezel 43.

In this in-vehicle display device, the frame 49 includes the groove portion 67. The groove portion 67 is elongated in a direction in which the frame extension portion 63 is pressed by the side portion of the front bezel 43 and the frame 49 moves. The OLED 31 is fastened to the front bezel 43 via the frame 49 by screwing the screw 55 inserted into the groove portion 67 of the frame 49 into the front bezel 43.

The screw 55 penetrating the groove portion 67 fastens the groove portion 67 of the frame 49 to the front bezel 43 with a predetermined tightening torque. The predetermined tightening torque referred to here is a tightening force (fixing force) to such an extent that the frame 49 does not move (displace) with respect to the front bezel 43 depending on an inertial force, vibration, or impact load acting on an assembly of the frame 49 and the OLED 31 during normal vehicle traveling or stopping.

On the other hand, when the frame extension portion 63 of the frame 49 is pressed by the side portion deformed by the impact, the pressing load is larger than the fixing force for the frame 49. In other words, the fixing force for the frame 49 due to screw fastening is set to be smaller than the pressing load when the frame extension portion 63 is pressed.

Accordingly, in the in-vehicle display device, when an impact is applied from the lateral side of the vehicle body and the frame extension portion 63 is pressed by the side portion of the front bezel 43, the OLED 31 is moved together with the frame 49 with respect to the rear bezel 41. That is, the OLED 31 moves together with the frame 49 in a direction in which the impact load is applied, so that the impact load acting on the OLED 31 is reduced as compared with that acting on a support structure in which the OLED 31 is rigidly fixed. That is, in the in-vehicle display device, the impact applied to the OLED 31 can be released (reduced). As a result, even in an in-vehicle display device using the transparent OLED 31 in which a structure for support cannot be provided on the back side, the OLED 31 can be prevented from being damaged and scattered during a side collision.

Further, in the in-vehicle display device (that is, display device 27), a screw-fastening portion is formed in the frame 49. The boss 71 including the female screw portion 69 into which the screw 55 inserted into the screw-fastening portion is screwed is formed on the front bezel 43. The fragile portion 73 having a load capacity lower than a load of pressing is formed at the base portion of the boss 71 between the front bezel 43 and the female screw portion 69.

In this in-vehicle display device, the screw-fastening portion is formed in the frame 49. On the other hand, the front bezel 43 is formed with the boss 71 including the female screw portion 69 into which the screw 55 inserted into the screw-fastening portion is screwed. The base portion of the boss 71 is between the front bezel 43 and the female screw portion 69. The fragile portion 73 is formed at the base portion. The fragile portion 73 is formed with a load capacity lower than the pressing load when the frame extension portion 63 is pressed by the side portion deformed by the impact. The fragile portion 73 is configured to be broken when an external force larger than the load capacity is applied.

More specifically, the boss 71 is configured such that, for example, the fragile portion 73 formed of a thin cylindrical portion or the like is coaxially formed on the base portion of the boss 71 formed in a columnar shape including the female screw portion 69, and the cylindrical portion is crushed or sheared and broken by a pressing load in an axis intersecting direction. The fragile portion 73 may be made of a synthetic resin other than metal. For the fragile portion 73 made of synthetic resin, it is easy to design a wall thickness or a cross-sectional shape in detail and bring energy consumption, a force direction, a force dispersion ratio, and the like in a process of crushing or breaking close to desired values.

Accordingly, in this in-vehicle display device, when an impact is applied from the lateral side of the vehicle body and the frame extension portion 63 is pressed by the side portion of the front bezel 43, the OLED 31 is moved together with the frame 49 with respect to the rear bezel 41. That is, the OLED 31 moves together with the frame 49 in a direction in which the impact load is applied, so that the impact load acting on the OLED 31 is reduced as compared with that acting on a support structure in which the OLED 31 is rigidly fixed. That is, in the in-vehicle display device, the impact applied to the OLED 31 can be released (reduced). As a result, even in an in-vehicle display device using the transparent OLED 31 in which a structure for support cannot be provided on the back side, the OLED 31 can be prevented from being damaged and scattered during a side collision.

In this in-vehicle display device, when all the fragile portions 73 are broken, the frame 49 and the OLED 31 are not supported and may move in any direction between the rear bezel 41 and the front bezel 43, but the frame 49 is held by the bezel 39, and thus the frame 49 and the OLED 31 do not fall off from the bezel 39.

Further, in the in-vehicle display device (that is, display device 27), the rear bezel 41 and the front bezel 43 are engaged with each other by the hook 75 that can be disengaged. The OLED 31 is supported so as to be movable together with the frame 49 and the front bezel 43 with respect to the rear bezel 41 by the disengagement of the hook 75 by pressing.

In this in-vehicle display device, the rear bezel 41 and the front bezel 43 are engaged with each other by the hook 75 that can be disengaged. That is, the rear bezel 41 and the front bezel 43 constitute a frame assembly that can be disengaged. In this frame assembly, when disengaged, the front bezel 43 is moved with respect to the rear bezel 41 fixed to the vehicle body. That is, the OLED 31 is configured to be movable together with the frame 49 and the front bezel 43 with respect to the rear bezel 41.

The hook 75 is configured such that the rear bezel 41 and the front bezel 43 are not completely separated when disengaged. This is to prevent an assembly of the front bezel 43, the frame 49, and the OLED 31 disengaged from the rear bezel 41 from falling from the rear bezel 41 and colliding with an inner wall of the vehicle interior, the vehicle floor 23, and the like, and glass of the OLED 31 being scattered.

More specifically, this engagement structure can include, for example, a dovetail groove-shaped slide groove and a hook 75 including a wedge-shaped engagement claw engaged with the slide groove. The slide groove is formed in, for example, the rear bezel 41. The slide groove is formed along a longitudinal direction of each of the vertical frame portion 45 and the lateral frame portion 47 of the rear bezel 41. On the other hand, a plurality of hooks 75 are provided on each of the vertical frame portion 45 and the lateral frame portion 47 of the front bezel 43 at predetermined intervals in the longitudinal direction.

The hook 75 protruding from the side portion of the front bezel 43 engages with the slide groove formed in the vertical frame portion 45 of the rear bezel 41. On the other hand, the hook 75 protruding from the lateral frame portion 47 of the front bezel 43 engages with the slide groove formed in the lateral frame portion 47 of the rear bezel 41.

In this example, when an impact is applied from the lateral side of the vehicle body, a flexible arm portion of the hook 75 is deformed or disengaged, and the side portion of the front bezel 43 is deformed. At this time, the side portion of the rear bezel 41 may also be deformed at the same time. The frame extension portion 63 is pressed by the deformed side portion. In the front bezel 43 to which the frame 49 is fixed, due to this pressing load, the wedge-shaped engagement claw engaged with the dovetail groove-shaped slide groove moves along the slide groove (that is, along the upper and lower lateral frame portions 47). That is, even when the vertical frame portions 45 are disengaged, the lateral frame portions 47 remain engaged, and thus the rear bezel 41 and the front bezel 43 are not completely separated from each other. The side portion pressed by the impact load and a side portion on an opposite side are pressed and deformed outward by the frame extension portion 63.

Accordingly, in the in-vehicle display device, when an impact is applied from the lateral side of the vehicle body and the frame extension portion 63 is pressed by the side portion of the front bezel 43, the OLED 31 is moved together with the frame 49 with respect to the rear bezel 41. That is, the OLED 31 moves together with the frame 49 in a direction in which the impact load is applied, so that the impact load acting on the OLED 31 is reduced as compared with that acting on a support structure in which the OLED 31 is rigidly fixed. That is, in the in-vehicle display device, the impact applied to the OLED 31 can be released (reduced). As a result, even in an in-vehicle display device using the transparent OLED 31 in which a structure for support cannot be provided on the back side, the OLED 31 can be prevented from being damaged and scattered during a side collision.

Embodiment 2

Figure 14:
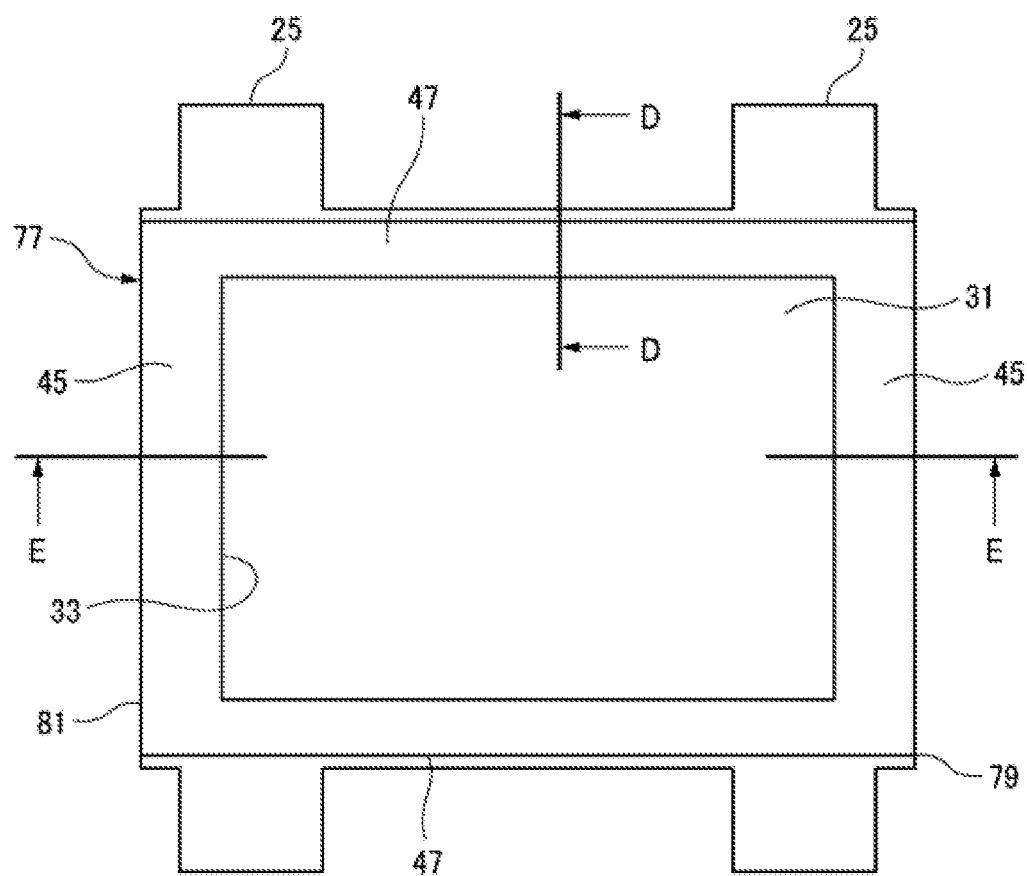
FIG. 14 is a front view schematically illustrating a display device including an in-vehicle display device according to an embodiment 2.

FIG. 14 is a front view schematically illustrating a display device 77 including an in-vehicle display device according to Embodiment 2. In Embodiment 2, members equivalent to the members illustrated in FIG. 1 to FIG. 13 are denoted by the same reference numerals, and overlapping description will be simplified or omitted.

The in-vehicle display device (that is, display device 77) according to Embodiment 2 has a function of reducing an impact applied from the lateral side of the vehicle body (right side or the left side in FIG. 14). The display device 77 includes a frame-shaped bezel 79. The bezel 79 constitutes a frame body having a rectangular frame shape by combining a rear bezel 41 and a front bezel 81. That is, the bezel 79, which is a frame body, is configured by connecting the pair of left and right parallel vertical frame portions 45 and the pair of upper and lower parallel lateral frame portions 47 in a rectangular frame shape. The rear bezel 41 is fixed to the vehicle body via the column portions 25 by being fixed to the column portions 25. The front bezel 81 is attached to the rear bezel 41. The front bezel 81 is attached to the rear bezel 41 by the screw 55 or the like. In the bezel 79, the front bezel 81 is formed in a shape different from that in Embodiment 1.

Figure 15:
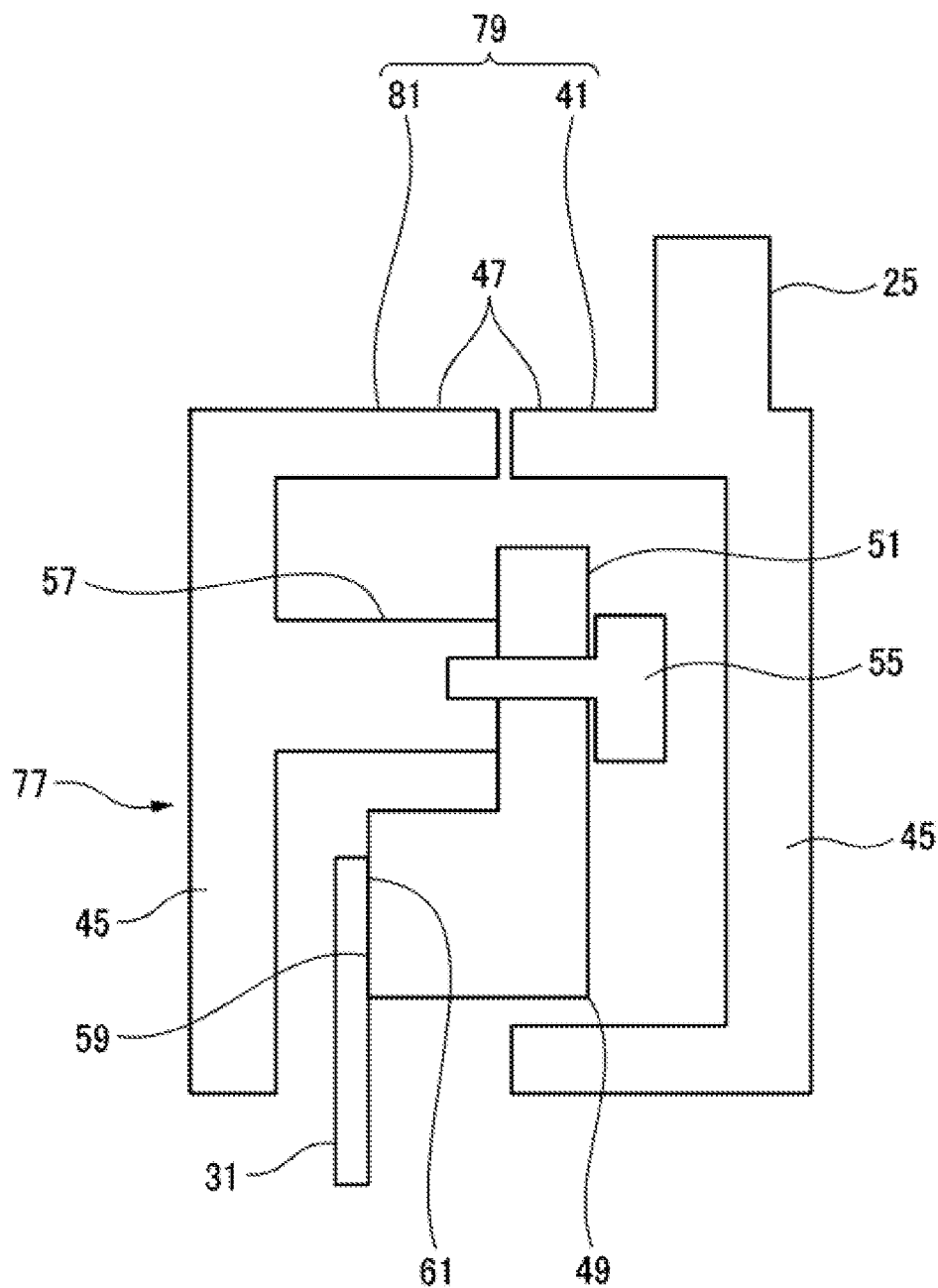
FIG. 15 is a sectional view taken along line D-D in FIG. 14.

FIG. 15 is a sectional view taken along line D-D in FIG. 14.

The outer edge portion 51 of the frame 49 formed in a frame shape is attached to the front bezel 81 by a fastening member such as a screw. Only the outer edge portion 51 of the lateral frame portion 53 of the frame 49 is attached to the front bezel 81. The plurality of fixing bosses 57 into which the screws 55 are screwed are formed on an inner surface of the front bezel 81. The OLED 31 is fixed to the frame 49. An outer peripheral edge 61 of the OLED 31 is fixed to an inner peripheral edge 59 of the frame 49. Accordingly, the OLED 31 is supported by the front bezel 81 via the frame 49, and the front bezel 81 is supported by the column portions 25 via the rear bezel 41.

Figure 16:
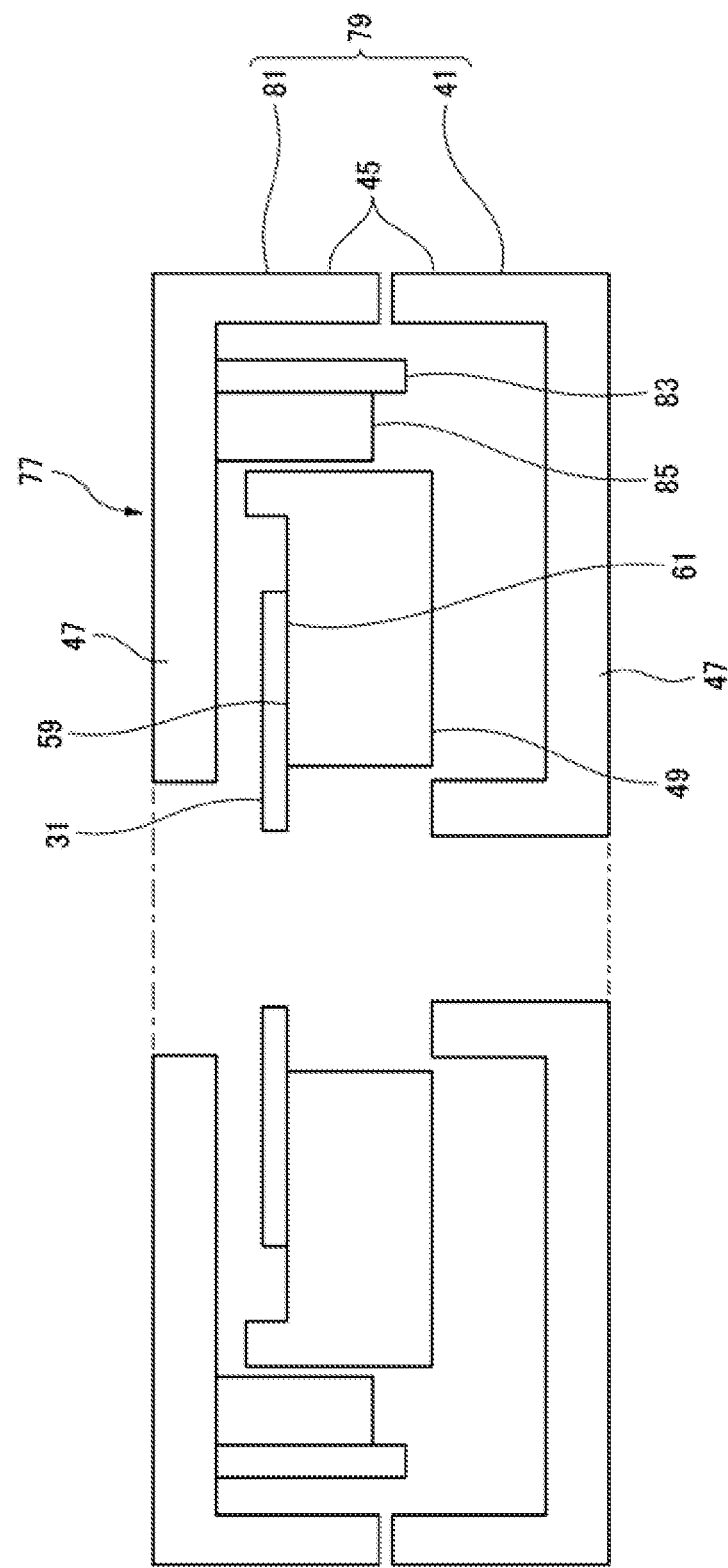
FIG. 16 is a sectional view taken along line E-E in FIG. 14.

FIG. 16 is a sectional view taken along line E-E in FIG. 14.

In the in-vehicle display device according to Embodiment 2, unlike Embodiment 1, an impact absorption member is disposed at least between a side portion of the front bezel 81 and the frame 49. In Embodiment 2, a support wall 83 parallel to the side portion is formed between the side portion of the front bezel 81 and the frame 49 so as to face the frame 49. In Embodiment 2, the impact absorption member is disposed between the support wall 83 and the frame 49. In the in-vehicle display device according to Embodiment 2, the support wall 83 may be omitted, and the impact absorption member may be disposed in a sandwiched state between the side portion of the front bezel 81 and the frame 49.

In Embodiment 2, the frame 49 does not need the frame extension portion 63 according to Embodiment 1. That is, the impact absorption member is disposed in a space in which the frame extension portion 63 is disposed in Embodiment 1. In Embodiment 2, the frame 49 is parallel to and faces each of the support wall 83 of the front bezel 81 and the side portion of the front bezel 81. In Embodiment 2, the frame 49 is located at a position where the frame 49 does not interfere with the side portion of the rear bezel 41 even when the side portion of the rear bezel 41 is deformed due to an impact, but the frame 49 is not limited to this. That is, the impact absorption member may be disposed in a sandwiched state between the side portions of the front bezel 81 and the rear bezel 41 and the frame 49.

In Embodiment 2, the impact absorption member is, for example, a cushion material 85. The cushion material 85 is disposed to fill a space between the frame 49 and the support wall 83. The cushion material 85 may be, for example, a sheet-shaped, block-shaped, or gel-shaped member. The cushion material 85 is attached to a side surface of the frame 49 or the support wall 83 by, for example, double-sided adhesive tape. As the cushion material 85, for example, an air cap, high foamed polyethylene, high density urethane foam, foamed polypropylene, polyethylene, foamed nitrile rubber, a thermoplastic elastomer, a gel-shaped impact absorption material, or the like can be used.

Figure 17:
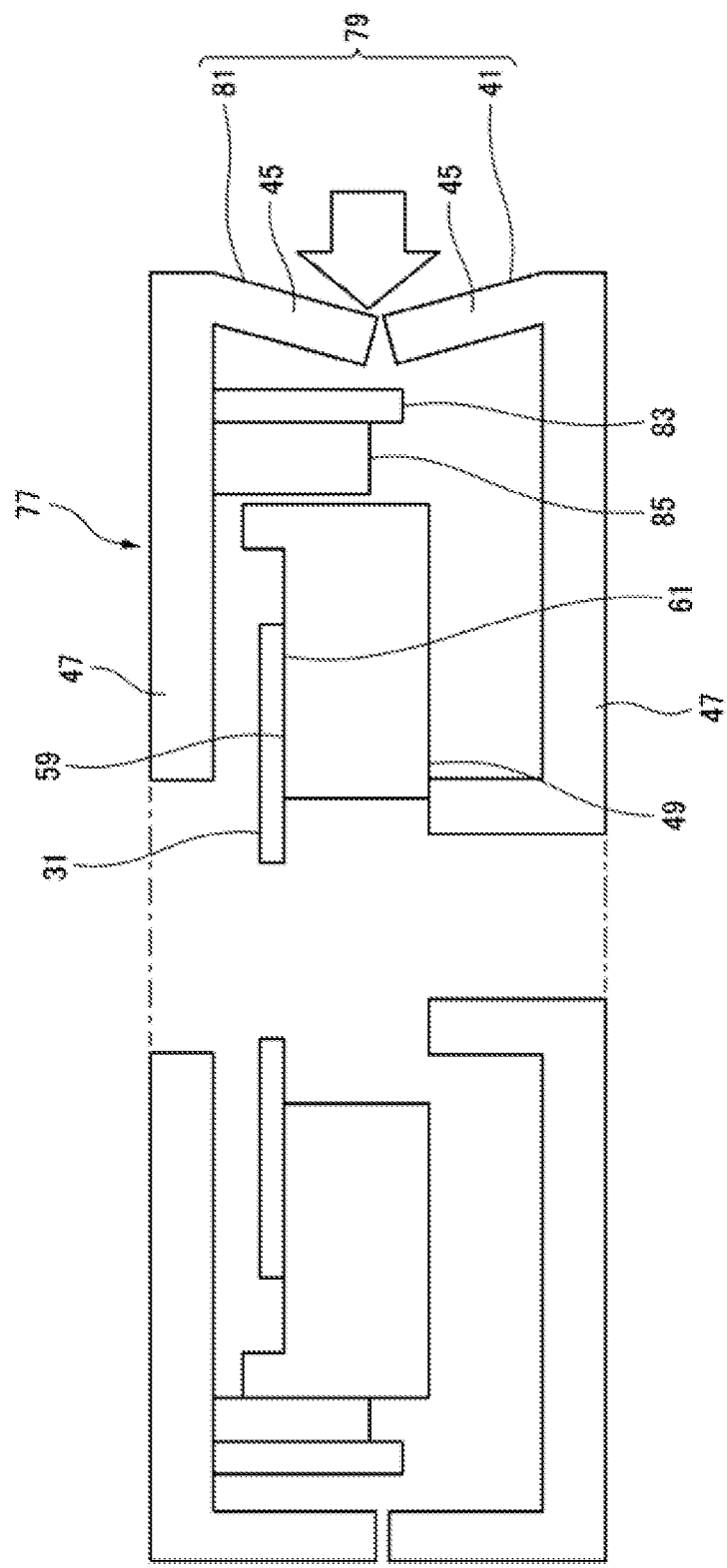
FIG. 17 is a plan sectional view of a main portion of the display device in which a side portion of a bezel is deformed by an impact due to a side collision.

FIG. 17 is a plan sectional view of a main portion of the display device 77 in which a side portion of the bezel 79 is deformed by an impact due to a side collision. The plan sectional position of the main portion in FIG. 17 is the same as the sectional position taken along line E-E in FIG. 14.

In Embodiment 2, the OLED 31 is supported such that at least a part of a load applied via the frame 49 by the side portion of the bezel 79 deformed by the impact can be absorbed by the cushion material 85. Further, in the in-vehicle display device according to Embodiment 2, in a case in which the side portion of the bezel 79 collides with the cushion material 85 and the cushion material 85 absorbs a collision load acting on the frame 49, when the frame 49 moves, a cushion material 85 disposed between the side portion on the opposite side and the frame 49 is pressed and deformed. The cushion material 85 on the opposite side also absorbs (receives) the collision load by this deformation. That is, the cushion material 85 on the opposite side is disposed so as to be able to absorb a collision load caused by a reaction force received by the frame 49 from the side portion of the bezel 79 on the opposite side by the frame 49 abutting against the side portion of the bezel 79 on the opposite side when there is no cushion material 85 on the opposite side.

Next, a modification of the in-vehicle display device according to Embodiment 2 will be described.

Modification 1 of Embodiment 2

Figure 18:
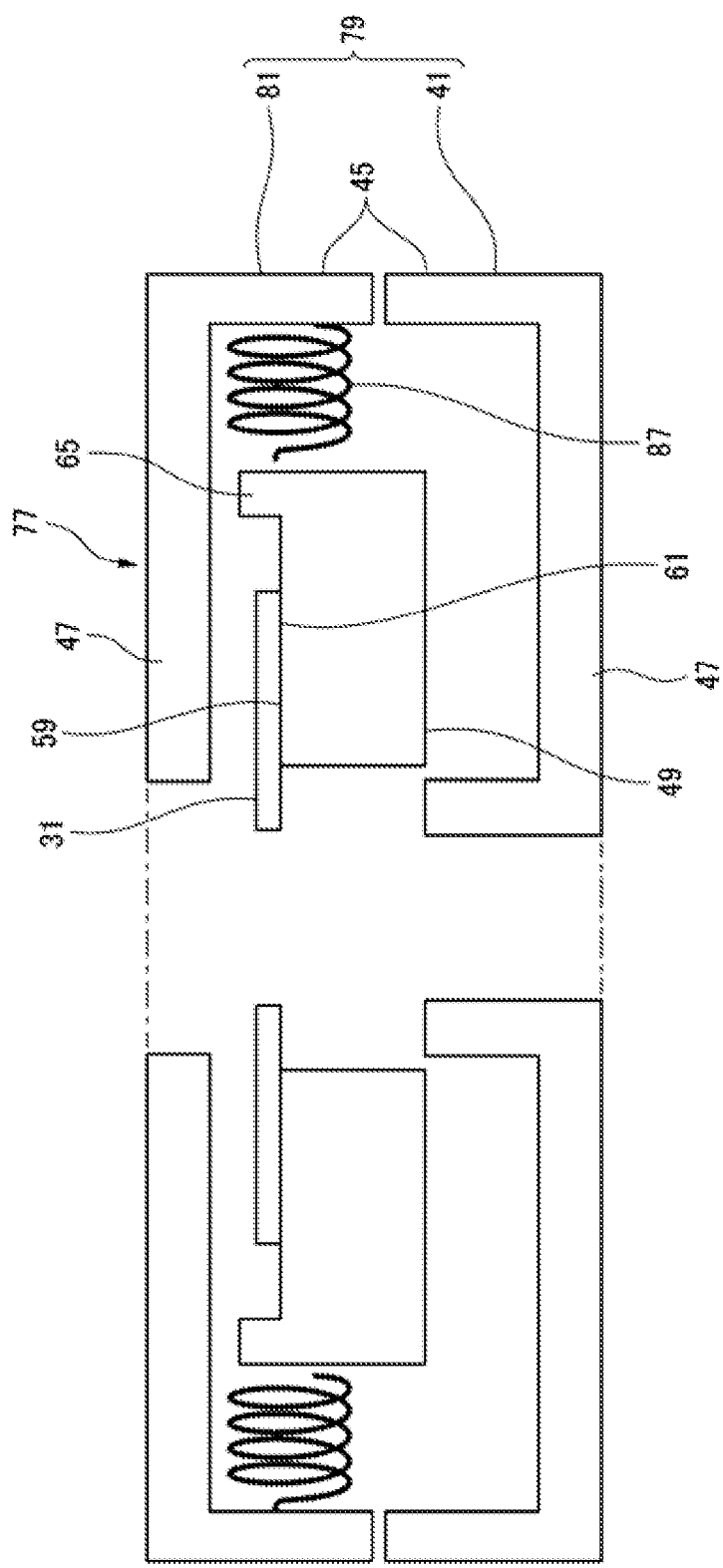
FIG. 18 is a plan sectional view of a main portion of a display device in which a spring is used as an impact absorption member, according to a modification 1 of the embodiment 2.

FIG. 18 is a plan sectional view of a main portion of the display device 77 in which a spring is used as the impact absorption member, according to Modification 1 of Embodiment 2. The plan sectional position of the main portion in FIG. 18 is the same as the sectional position taken along line E-E in FIG. 14.

In the in-vehicle display device according to Modification 1 of Embodiment 2, the impact absorption member is, for example, a spring. As the spring, for example, a coil spring 87 or a plate spring can be used. In Modification 1 of Embodiment 2, the coil spring 87 is used. The coil spring 87 can be disposed, for example, with one end abutting on the vertical frame portion 65 and the other end abutting on the side portion of the front bezel 81. The other end of the coil spring 87 may be disposed abutting on the side portion of the rear bezel 41 close to the front bezel 81.

Figure 19:
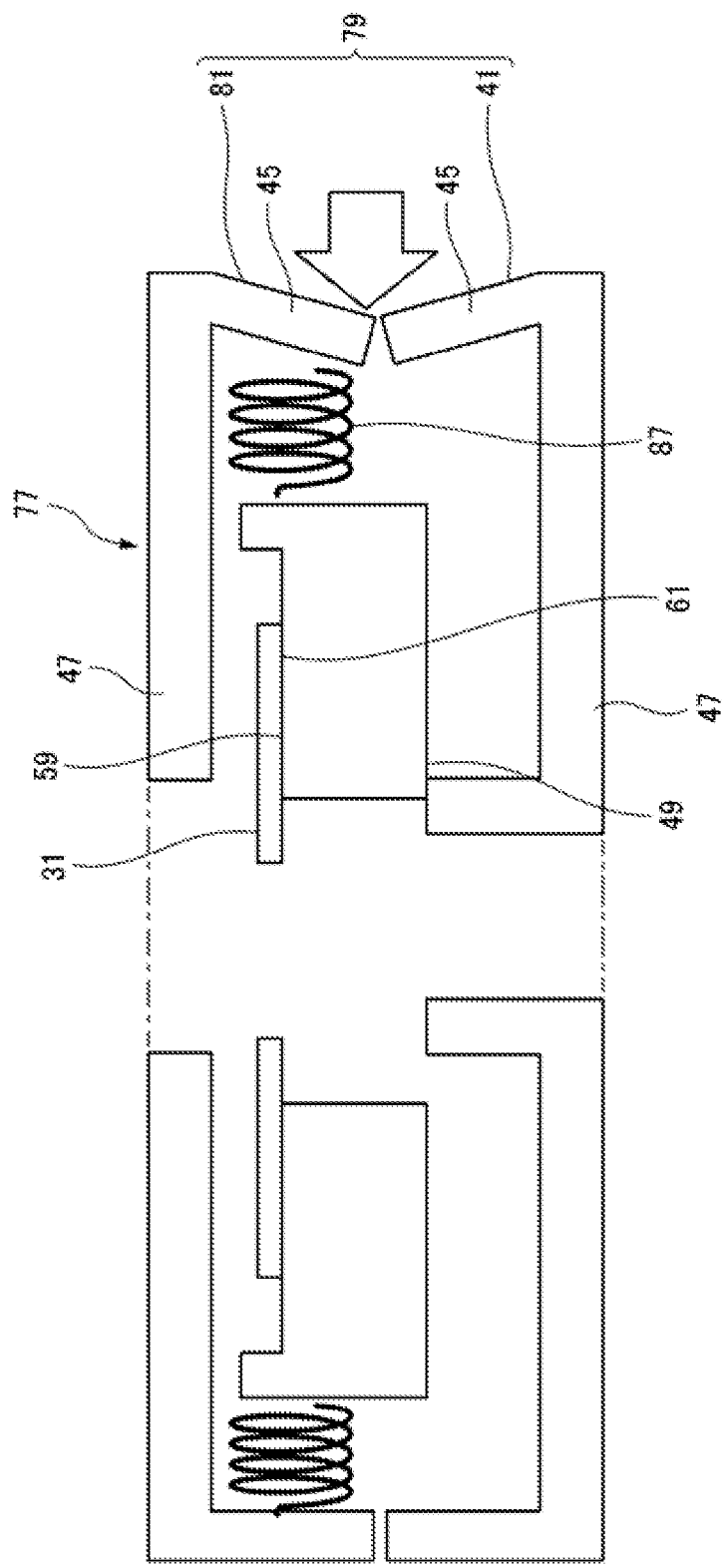
FIG. 19 is a plan sectional view of the main portion of the display device in which a side portion of a bezel is deformed by an impact due to a side collision.

FIG. 19 is a plan sectional view of the main portion of the display device 77 in which the side portion of the bezel 79 is deformed by an impact due to a side collision. The plan sectional position of the main portion in FIG. 19 is the same as the sectional position taken along line E-E in FIG. 14.

In Modification 1 of Embodiment 2, the OLED 31 is supported such that at least a part of the load applied via the frame 49 by the side portion deformed by the impact can be absorbed by the coil spring 87. In Modification 1 of Embodiment 2, in a case in which the side portion of the bezel 79 collides with the coil spring 87 and the coil spring 87 absorbs a collision load acting on the frame 49, when the frame 49 moves, a coil spring 87 disposed between the side portion on the opposite side and the frame 49 is pressed and deformed. The coil spring 87 on the opposite side also absorbs (receives) the collision load by this deformation. That is, the coil spring 87 on the opposite side is disposed so as to be able to absorb a collision load caused by a reaction force received by the frame 49 from the side portion of the bezel 79 on the opposite side by the frame 49 abutting against the side portion of the bezel 79 on the opposite side when there is no coil spring 87 on the opposite side.

Modification 2 of Embodiment 2

Figure 20:
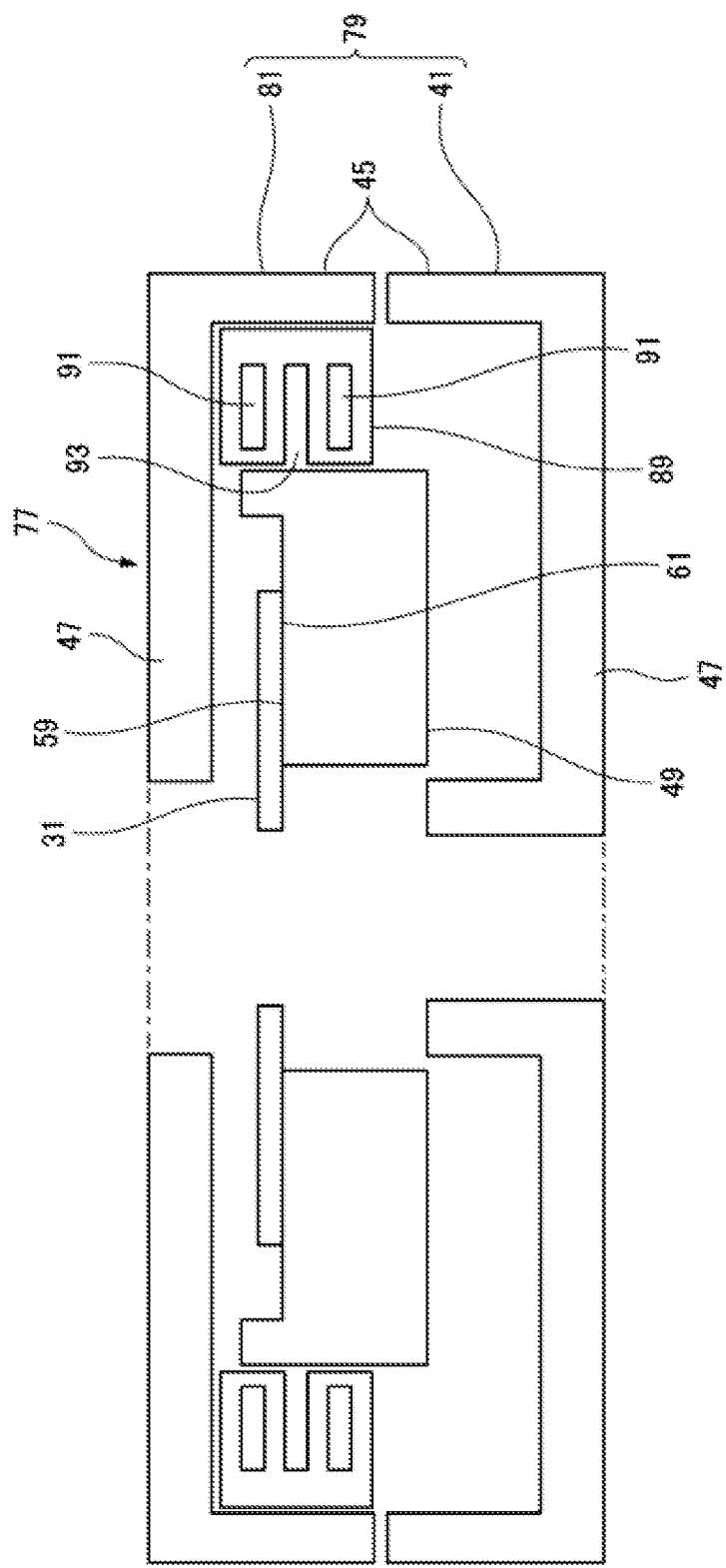
FIG. 20 is a plan sectional view of a main portion of a display device in which a crushable component is used as an impact absorption member, according to a modification 2 of the embodiment 2.

FIG. 20 is a plan sectional view of a main portion of the display device 77, in which a crushable component 89 is used as the impact absorption member, according to Modification 2 of Embodiment 2. The plan sectional position of the main portion in FIG. 20 is the same as the sectional position taken along line E-E in FIG. 14.

In the in-vehicle display device according to Modification 2 of Embodiment 2, the impact absorption member is, for example, the crushable component 89. The crushable component 89 can be, for example, a resin plate or block body in which a plurality of relief chambers 91 or recesses 93 are integrally molded with a thin wall member. The plurality of relief chambers 91 or recesses 93 may be arranged in a direction in which a collision load is applied, or may be arranged in a direction orthogonal to the direction in which the collision load is applied. The crushable component 89 can be disposed, for example, with one end abutting on the vertical frame portion 65 and the other end abutting on the side portion of the front bezel 81. The other end of the coil spring 87 may be disposed abutting on the side portion of the rear bezel 41 close to the front bezel 81.

Figure 21:
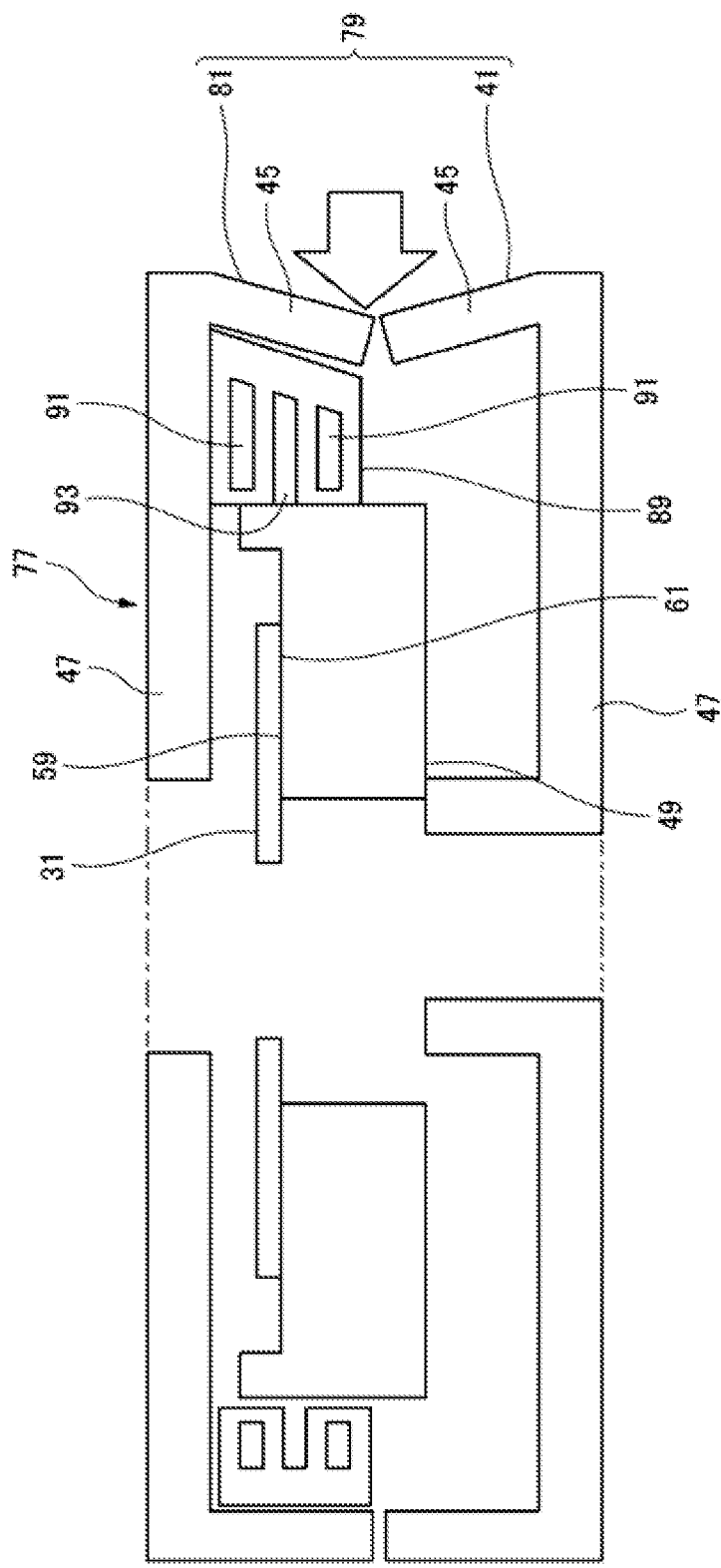
FIG. 21 is a plan sectional view of the main portion of the display device in which a side portion of a bezel is deformed by an impact due to a side collision.

FIG. 21 is a plan sectional view of the main portion of the display device 77 in which the side portion of the bezel 79 is deformed by an impact due to a side collision. The plan sectional position of the main portion in FIG. 21 is the same as the sectional position taken along line E-E in FIG. 14.

In Modification 2 of Embodiment 2, the OLED 31 is supported such that at least a part of the load applied via the frame 49 by the side portion deformed by the impact can be absorbed by the crushable component 89. Further, in Modification 2 of Embodiment 2, in a case in which the side portion of the bezel 79 collides with the crushable component 89 and the crushable component 89 absorbs a collision load acting on the frame 49, when the frame 49 moves, a crushable component 89 disposed between the side portion on the opposite side and the frame 49 is pressed and deformed. The crushable component 89 on the opposite side also absorbs (receives) the collision load by this deformation. That is, the crushable component 89 on the opposite side is disposed so as to be able to absorb a collision load caused by a reaction force received by the frame 49 from the side portion on the opposite side by the frame 49 abutting against the side portion on the opposite side when there is no crushable component 89 on the opposite side.

Next, operations of the above-described configuration will be described.

The in-vehicle display device (that is, display device 77) according to Embodiment 2 is supported by the vehicle body and disposed between the front seat 13 and the rear seat 15 of the vehicle body. The display device 77 includes the rear bezel 41 fixed to the vehicle body, the front bezel 81 attached to the rear bezel 41, the frame 49 including the outer edge portion 51 attached to the front bezel 81, a display panel (for example, OLED 31) including the outer peripheral edge 61 fixed to the inner peripheral edge 59 of the frame 49, and the impact absorption member disposed at least between the side portion of the front bezel 81 and the frame 49. The OLED 31 is supported such that at least a part of the load applied via the frame 49 by the side portion of the bezel 79 deformed due to an impact (for example, side collision) applied from the lateral side of the vehicle body can be absorbed by the impact absorption member.

In this in-vehicle display device, the rear bezel 41 is fixed to the vehicle body between the front seat 13 and the rear seat 15 of the vehicle body. The front bezel 81 is attached to the rear bezel 41 toward the rear seat 15 so as to face the rear seat 15. The outer edge portion 51 of the frame 49 is attached to the front bezel 81. The outer peripheral edge 61 of the OLED 31 is fixed to the inner peripheral edge 59 of the frame 49. That is, in the OLED 31, the frame 49 fixed to the outer peripheral edge 61 is held and accommodated between the rear bezel 41 and the front bezel 81, and only the display area 33 is exposed through an internal opening of the bezel 79.

Since the OLED 31 is transparent, an object disposed on a back side of the OLED 31 can be visually recognized by visible light transmitted through the display area 33. Since the portion other than the bezel 79 that covers the outer peripheral edge 61 of the OLED 31 is the transparent display area 33 of the OLED 31, when the display device 77 is driven, the display device 77 can provide a passenger in the rear seat 15 with a highly entertaining viewing space where images visually blend into back or surroundings thereof.

In this in-vehicle display device, the outer edge portion 51 of the frame 49 is attached to the front bezel 81. The outer edge portion 51 is, for example, the lateral frame portion 53. The frame 49 is attached to the front bezel 81 by screwing the screw 55 penetrating the lateral frame portion 53 into the front bezel 81. The impact absorption member is disposed between the side portion of the front bezel 81 and the vertical frame portion 65. The impact absorption member can be attached to, for example, the vertical frame portion 65.

Accordingly, in the in-vehicle display device, in a case in which a side surface of the vehicle body is subjected to a strong impact, and a side door or a vehicle body pillar is deformed inward in a vehicle width direction due to an impact load, door trim or pillar trim protrudes into the vehicle interior and hits the front bezel 81. When the side portion of the front bezel 81 is deformed inward due to the impact and comes to collide with the frame 49, the impact absorption member disposed between the side portion and the vertical frame portion 65 is deformed. The impact absorption member absorbs the collision load by being deformed. That is, the collision load of the OLED 31 fixed to the frame 49 is reduced by energy consumption in a process of crushing or breaking the impact absorption member. Since the impact absorption members are disposed on right and left sides of the OLED 31, the impacts applied to the side portions are absorbed from both right and left.

In this in-vehicle display device, in a case in which the side portion collides with the impact absorption member and the impact absorption member absorbs a collision load acting on the frame 49, when the frame 49 moves, an impact absorption member disposed between the side portion on the opposite side and the frame 49 is pressed and deformed. The impact absorption member absorbs (receives) a collision load (collision load caused by the reaction force received by the frame 49 from the side portion by the moved frame 49 abutting against the side portion) due to this deformation. That is, in the in-vehicle display device, the impact applied to the OLED 31 can be released (reduced) at the left and right side portions. As a result, even in an in-vehicle display device using the transparent OLED 31 in which a structure for support cannot be provided on the back side, the OLED 31 can be prevented from being damaged and scattered during a side collision. Further, when the display device 27 is not driven, since the OLED 31 is transparent, the feelings of being confined and oppressed in the rear seat 15 can be reduced.

In the in-vehicle display device, the impact absorption member is the cushion material 85.

In this in-vehicle display device, the cushion material 85 is used as the impact absorption member. The cushion material 85 can be attached to, for example, the vertical frame portion 65.

In this in-vehicle display device, when a side surface of the vehicle body is subjected to a strong impact, and the side portion of the front bezel 81 is deformed inward due to the impact and comes to collide with the frame 49, the cushion material 85 disposed between the side portion and the vertical frame portion 65 is deformed. The cushion material 85 absorbs the collision load by being deformed. That is, the collision load of the OLED 31 fixed to the frame 49 is reduced by energy consumption in a process of deforming or crushing the cushion material 85. Since the cushion materials 85 are disposed on the right and left sides of the OLED 31, the impacts applied to the side portions are absorbed from both right and left.

In this in-vehicle display device, when the frame 49 moves, the cushion material 85 disposed between the side portion on the opposite side and the frame 49 is pressed and deformed. The cushion material 85 absorbs (receives) a collision load (collision load caused by the reaction force received by the frame 49 from the side portion by the moved frame 49 abutting against the side portion) due to this deformation. That is, in the in-vehicle display device, the impact applied to the OLED 31 can be released (reduced) at the left and right side portions. As a result, even in an in-vehicle display device using the transparent OLED 31 in which a structure for support cannot be provided on the back side, the OLED 31 can be prevented from being damaged and scattered during a side collision.

In the in-vehicle display device, the impact absorption member is a spring.

In this in-vehicle display device, the spring is used as the impact absorption member. As the spring, for example, a coil spring 87 or a plate spring can be used. The spring can be disposed, for example, with one end abutting on the vertical frame portion 65 and the other end abutting on the side portion.

In this in-vehicle display device, when a side surface of the vehicle body is subjected to a strong impact, and the side portion of the front bezel 81 is deformed inward due to the impact and comes to collide with the frame 49, the spring disposed between the vertical frame portion 65 and the side portion is deformed. The spring absorbs the collision load by being deformed. That is, the collision load of the OLED 31 fixed to the frame 49 is reduced by energy consumption in a process of deforming the spring. Since the springs are disposed on the right and left sides of the OLED 31, the impacts applied to the side portions are absorbed from both right and left.

In this in-vehicle display device, when the frame 49 moves, a spring disposed between the side portion on the opposite side and the frame 49 is pressed and deformed. The spring absorbs (receives) a collision load (collision load caused by the reaction force received by the frame 49 from the side portion by the moved frame 49 abutting against the side portion) due to this deformation. That is, in the in-vehicle display device, the impact applied to the OLED 31 can be released (reduced) at the left and right side portions. As a result, even in an in-vehicle display device using the transparent OLED 31 in which a structure for support cannot be provided on the back side, the OLED 31 can be prevented from being damaged and scattered during a side collision.

In the in-vehicle display device, the impact absorption member is the crushable component 89.

In the in-vehicle display device, the crushable component 89 is used as the impact absorption member. The crushable component 89 can be disposed, for example, with one end abutting on the vertical frame portion 65 and the other end abutting on the side portion.

In this in-vehicle display device, when a side surface of the vehicle body is subjected to a strong impact, and the side portion of the front bezel 81 is deformed inward due to the impact and comes to collide with the frame 49, the crushable component 89 disposed between the vertical frame portion 65 and the side portion is deformed. The crushable component 89 absorbs the collision load by being deformed. That is, the collision load of the OLED 31 fixed to the frame 49 is reduced by energy consumption in a process of deforming (crushing) or breaking the crushable component 89. Since the crushable components 89 are disposed on the right and left sides of the OLED 31, the impacts applied to the side portions are absorbed from both right and left.

In this in-vehicle display device, when the frame 49 moves, a crushable component 89 disposed between the side portion on the opposite side and the frame 49 is pressed and deformed. The crushable component 89 absorbs (receives) a collision load (collision load caused by the reaction force received by the frame 49 from the side portion by the moved frame 49 abutting against the side portion) due to this deformation. That is, in the in-vehicle display device, the impact applied to the OLED 31 can be released (reduced) at the left and right side portions. As a result, even in an in-vehicle display device using the transparent OLED 31 in which a structure for support cannot be provided on the back side, the OLED 31 can be prevented from being damaged and scattered during a side collision.

The above-described Embodiment 1 and Embodiment 2 illustrate the technique disclosed in the present disclosure, and various changes, replacements, additions, omissions, and the like can be made within the scope of the claims or the equivalent scope thereof.

Figure 22:
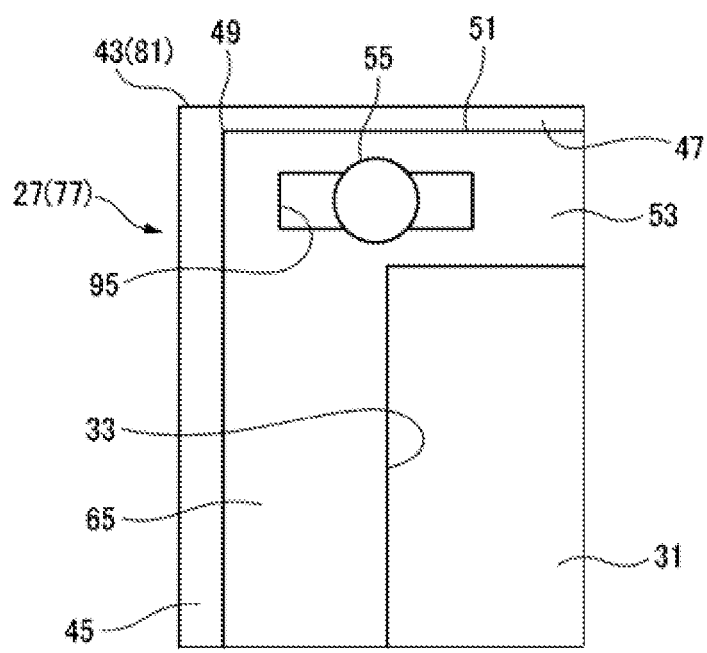
FIG. 22 is an enlarged front view of a main portion of a frame in which a groove portion is an elongated hole having a closed inner periphery.

FIG. 22 is an enlarged front view of a main portion of the frame 49 in which the groove portion 67 is an elongated hole 95 having a closed inner periphery.

For example, in the in-vehicle display device according to Embodiment 1 and Embodiment 2, the example in which the screw-fastening portion formed in the frame 49 is the groove portion 67 that is elongated in the movement direction has been described, and the groove portion 67 may be a part of the elongated hole 95 having the closed inner periphery.

That is, in the in-vehicle display device according to Embodiment 1 and Embodiment 2, the screw-fastening portion formed in the frame 49 is formed by the groove portion 67 that is elongated in the movement direction, and the groove portion 67 may be the elongated hole 95 having the closed inner periphery as illustrated in FIG. 22. The elongated hole 95 is formed with both ends in the longitudinal direction not open but closed. Accordingly, when the groove portion 67 is, for example, a C-shaped hole whose one end in the longitudinal direction is an open portion, the screw 55 can be prevented from falling off from the open portion. That is, since the screw-fastening portion is the elongated hole 95, the movement of the frame 49 can be restricted within a distance range of the elongated hole 95 in the longitudinal direction. As a result, the frame 49 does not fall even if the frame 49 slides. That is, when the collision load is applied from the side portion, the frame 49 can release (reduce) the impact by moving, and can also prevent detachment from the bezel 39 (bezel 79).

Although various embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the various embodiments described above may be combined freely in a range without deviating from the spirit of the disclosure.

INDUSTRIAL APPLICABILITY

The present disclosure is useful as an in-vehicle display device capable of reducing an impact applied to an OLED from a lateral direction.

What is claimed is:

1. An in-vehicle display device supported by a vehicle body and disposed between a front seat and a rear seat of the vehicle body, the in-vehicle display device comprising:
   a rear bezel fixed to the vehicle body;
   a front bezel attached to the rear bezel;
   a frame, located between the rear bezel and the front bezel, including an outer edge portion attached to the front bezel;
   a display panel including an outer peripheral edge fixed to an inner peripheral edge of the frame; and
   a frame extension portion extending from the frame and disposed at least close to a side portion of the front bezel, wherein by the frame extension portion being pressed by the side portion deformed due to an impact applied from a first lateral side of the vehicle body, the display panel is supported so as to be movable in a direction from the first lateral side to a second lateral side, the second lateral side being different from the first lateral side, together with the frame with respect to the rear bezel.

2. The in-vehicle display device according to claim 1, wherein a screw-fastening portion formed in the frame is formed by a groove portion that is elongated in a movement direction, and the frame is attached to the front bezel by screwing a screw inserted into the groove portion into the front bezel.

3. The in-vehicle display device according to claim 1, wherein a screw-fastening portion is formed in the frame, a boss including a female screw portion is formed on the front bezel, the female screw portion screwing a screw inserted into the screw-fastening portion, and a fragile portion having a load capacity lower than a load of pressing is formed at a base portion of the boss between the front bezel and the female screw portion.

4. The in-vehicle display device according to claim 1, wherein the rear bezel and the front bezel are engaged with each other by a disengageable hook, and the display panel is supported so as to be movable together with the frame and the front bezel with respect to the rear bezel by disengagement of the disengageable hook by pressing.

* * * * *